United States Patent
Mathew et al.

(10) Patent No.: US 9,887,981 B2
(45) Date of Patent: *Feb. 6, 2018

(54) SINGLE SIGN-ON BETWEEN MULTIPLE DATA CENTERS

(71) Applicant: Oracle International Corporation, Redwood Shores, CA (US)

(72) Inventors: Stephen Mathew, Karnataka (IN); Vamsi Motukuru, Monmouth Junction, NJ (US); Madhu Martin, Karnataka (IN); Vikas Pooven Chathoth, Karnataka (IN)

(73) Assignee: Oracle International Corporation, Redwood Shores, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/005,365

(22) Filed: Jan. 25, 2016

(65) Prior Publication Data
US 2016/0219040 A1 Jul. 28, 2016

Related U.S. Application Data

(63) Continuation of application No. 14/137,775, filed on Dec. 20, 2013, now Pat. No. 9,247,006.
(Continued)

(51) Int. Cl.
*G06F 17/00* (2006.01)
*H04L 29/06* (2006.01)
(Continued)

(52) U.S. Cl.
CPC .......... *H04L 63/0815* (2013.01); *G06F 21/41* (2013.01); *H04L 63/08* (2013.01);
(Continued)

(58) Field of Classification Search
CPC ... H04L 67/141; H04L 63/08; H04L 63/0815; H04L 65/1069; H04L 65/1066; H04L 63/20; H04L 63/10; G06F 21/41
(Continued)

(56) References Cited

U.S. PATENT DOCUMENTS 6,041,357 A * 3/2000 Kunzelman ......... H04L 63/0815
  709/228
6,055,637 A 4/2000 Hudson et al.
(Continued)

FOREIGN PATENT DOCUMENTS

EP  1864240  12/2007
WO  2015042546  3/2013
(Continued)

OTHER PUBLICATIONS

Murdoch "Hardened Stateless Session Cookies," Lecture Notes in Computer Science, pp. 93-101 (2008).
(Continued)

*Primary Examiner* — Mohammad W Reza
(74) *Attorney, Agent, or Firm* — Kilpatrick Townsend & Stockton LLP

(57) ABSTRACT

Systems and methods are disclosed for a single sign-on (SSO) enterprise system with multiple data centers that use a lightweight cookie on a user's client device. The lightweight cookie includes a reference to a data center in which the user is already authenticated, and a new data center contacts the old data center for creating a session for the user on the new data center. If the old data center is unavailable, then the new data center may fall back to accessing a local security store, a backup of keys, security tokens, and/or other security data, in order to create a local session for the user on the new data center.

16 Claims, 8 Drawing Sheets

Related U.S. Application Data

(60) Provisional application No. 61/880,400, filed on Sep. 20, 2013.

(51) Int. Cl.
*H04L 29/08* (2006.01)
*G06F 21/41* (2013.01)

(52) U.S. Cl.
CPC .............. *H04L 63/10* (2013.01); *H04L 63/20* (2013.01); *H04L 65/1066* (2013.01); *H04L 65/1069* (2013.01); *H04L 67/141* (2013.01)

(58) Field of Classification Search
USPC .......................................................... 726/1
See application file for complete search history.

(56) References Cited

U.S. PATENT DOCUMENTS

| | | | |
|---|---|---|---|
| 6,076,108 A | 6/2000 | Courts et al. | |
| 6,178,511 B1 | 1/2001 | Cohen et al. | |
| 6,338,064 B1 | 1/2002 | Ault et al. | |
| 6,385,724 B1 | 5/2002 | Beckman et al. | |
| 6,811,873 B2 | 11/2004 | Nadkarni | |
| 7,137,006 B1 * | 11/2006 | Grandcolas | G06F 21/41 |
| | | | 713/180 |
| 7,225,256 B2 | 5/2007 | Villavicencio | |
| 7,296,290 B2 | 11/2007 | Barriga et al. | |
| 7,426,642 B2 | 9/2008 | Aupperle et al. | |
| 7,437,594 B1 | 10/2008 | Mount et al. | |
| 7,496,953 B2 | 2/2009 | Andreev et al. | |
| 7,747,746 B2 | 6/2010 | Thayer et al. | |
| 7,761,911 B2 | 7/2010 | Song et al. | |
| 7,805,529 B2 | 9/2010 | Galluzzo et al. | |
| 7,818,582 B2 | 10/2010 | Marion et al. | |
| 7,886,000 B1 | 2/2011 | Calone et al. | |
| 7,908,380 B1 | 3/2011 | Chu et al. | |
| 7,996,376 B2 | 8/2011 | Singh et al. | |
| 8,001,232 B1 | 8/2011 | Saulpaugh et al. | |
| 8,073,954 B1 | 12/2011 | Tu et al. | |
| 8,117,649 B2 | 2/2012 | Hardt | |
| 8,244,907 B2 | 8/2012 | Hinton et al. | |
| 8,365,266 B2 | 1/2013 | Bogner et al. | |
| 8,438,635 B2 | 5/2013 | Das et al. | |
| 8,442,943 B2 | 5/2013 | Multer et al. | |
| 8,468,586 B2 | 6/2013 | Koottayi et al. | |
| 8,495,195 B1 * | 7/2013 | Abidogun | H04L 67/04 |
| | | | 709/223 |
| 8,544,069 B1 * | 9/2013 | Subbiah | G06F 21/41 |
| | | | 340/5.8 |
| 8,611,873 B2 | 12/2013 | Onyon et al. | |
| 8,627,435 B2 | 1/2014 | Sirota et al. | |
| 8,650,305 B2 | 2/2014 | Booth et al. | |
| 8,756,704 B2 | 6/2014 | Castellucci et al. | |
| 8,819,444 B2 | 8/2014 | Shahbazi et al. | |
| 8,843,997 B1 | 9/2014 | Hare | |
| 8,898,765 B2 | 11/2014 | Goyal et al. | |
| 8,955,037 B2 | 2/2015 | Srinivasan et al. | |
| 9,083,690 B2 | 7/2015 | Subramanya et al. | |
| 9,104,451 B2 | 8/2015 | Subramanya et al. | |
| 9,247,006 B2 | 1/2016 | Mathew et al. | |
| 9,544,293 B2 | 1/2017 | Mathew et al. | |
| 2002/0029269 A1 | 3/2002 | McCarty et al. | |
| 2002/0078365 A1 | 6/2002 | Burnett et al. | |
| 2004/0003259 A1 | 1/2004 | Chang et al. | |
| 2005/0091655 A1 | 4/2005 | Probert et al. | |
| 2005/0108570 A1 | 5/2005 | Gopalraj | |
| 2005/0120091 A1 | 6/2005 | Casais et al. | |
| 2005/0144482 A1 | 6/2005 | Anuszewski et al. | |
| 2006/0059546 A1 | 3/2006 | Nester et al. | |
| 2006/0218630 A1 | 9/2006 | Pearson et al. | |
| 2006/0236382 A1 | 10/2006 | Hinton et al. | |
| 2006/0277596 A1 | 12/2006 | Calvert et al. | |
| 2007/0147247 A1 | 6/2007 | Kalonji et al. | |
| 2007/0192326 A1 * | 8/2007 | Angal | G06F 11/1482 |
| 2008/0294781 A1 | 11/2008 | Hinton et al. | |
| 2009/0037763 A1 | 2/2009 | Adhya et al. | |
| 2010/0131755 A1 | 5/2010 | Zhu et al. | |
| 2010/0146611 A1 | 6/2010 | Kuzin et al. | |
| 2012/0078708 A1 | 3/2012 | Taylor et al. | |
| 2012/0191842 A1 | 7/2012 | Hu et al. | |
| 2012/0254949 A1 | 10/2012 | Mikkonen et al. | |
| 2012/0254957 A1 | 10/2012 | Fork et al. | |
| 2012/0266229 A1 | 10/2012 | Simone et al. | |
| 2012/0291090 A1 | 11/2012 | Srinivasan et al. | |
| 2013/0036454 A1 | 2/2013 | Purvis et al. | |
| 2013/0073670 A1 | 3/2013 | Das et al. | |
| 2013/0198818 A1 | 8/2013 | Hitchcock et al. | |
| 2014/0068702 A1 | 3/2014 | Hyndman et al. | |
| 2014/0344326 A1 | 11/2014 | Kamath et al. | |
| 2015/0082029 A1 | 3/2015 | Volchok | |
| 2015/0088978 A1 | 3/2015 | Motukuru et al. | |
| 2015/0089569 A1 | 3/2015 | Sondhi et al. | |
| 2015/0089570 A1 | 3/2015 | Sondhi et al. | |
| 2015/0089571 A1 | 3/2015 | Srinivasan et al. | |
| 2015/0089579 A1 | 3/2015 | Manza et al. | |
| 2015/0089580 A1 | 3/2015 | Manza et al. | |
| 2015/0089596 A1 | 3/2015 | Sondhi et al. | |
| 2015/0089597 A1 | 3/2015 | Srinivasan et al. | |
| 2015/0089604 A1 | 3/2015 | Mathew et al. | |
| 2015/0089614 A1 | 3/2015 | Mathew et al. | |
| 2015/0089617 A1 | 3/2015 | Sondhi et al. | |
| 2015/0089619 A1 | 3/2015 | Manza et al. | |
| 2015/0089620 A1 | 3/2015 | Manza et al. | |
| 2015/0089622 A1 | 3/2015 | Sondhi et al. | |
| 2015/0089623 A1 | 3/2015 | Sondhi et al. | |
| 2016/0248758 A1 | 8/2016 | Matthew et al. | |
| 2016/0381000 A1 | 12/2016 | Mathew et al. | |
| 2017/0034152 A1 | 2/2017 | Subramanya et al. | |
| 2017/0085556 A1 | 3/2017 | Mathew et al. | |
| 2017/0118218 A1 | 4/2017 | Koottayi et al. | |
| 2017/0118222 A1 | 4/2017 | Subramanya et al. | |

FOREIGN PATENT DOCUMENTS

| | | |
|---|---|---|
| WO | 2013049461 | 4/2013 |
| WO | 2015042547 | 3/2015 |

OTHER PUBLICATIONS

"Developing an Application to Manage Impersonation" Fusion Middleware Developer's Guide for Oracle Access Management (Nov. 2012) 10 pages.

U.S. Appl. No. 14/135,053, Notice of Allowance dated Aug. 31, 2016, 9 pages.

U.S. Appl. No. 14/491,076, Final Office Action dated Oct. 6, 2016, 19 pages.

U.S. Appl. No. 14/491,076, Final Office Action dated Oct. 25, 2016, 18 pages.

"Implementing Single Sign-On Across Multiple Organizations", Developer.force.com, http://wiki.developerforce.com/page/Implementing_Single_Sign-On_Across_Multiple_Organizations; Accessed on Dec. 19, 2013.

"Big-IP Access Policy Manager", http://www.f5.com/pdf/products/big-ip-access-policy-manager-ds.pdf (copyright 2013).

Ferguson, A. and Hockings, C. Session management server: Session transitions and state. ibm.com/developerworks/ [online]. Jun. 25, 2007, IBM [retrieved May 18, 2015]. Retrieved from the Internet: <URL: http://www.ibm.com/developerworks/tivoli/library/t-sms-states/>, 7 pages.

Gaur, N. IBM Extreme Transaction Processing (XTP) Patterns: Scalable and robust HTTP session management with WebSphere eXtreme Scale. ibm.com/developerworks/ [online]. May 27, 2009, IBM [retrieved Jan. 6, 2015]. Retrieved from the Internet: <URL: http://www.ibm.com/developerworks/websphere/library/techarticles/0905_gaur/0905_gaur.html>, 8 pages.

IBM Security Access Manager for Enterprise Single Sign-On. Data Sheet [online]. Copyright 2013 IBM Corporation [retrieved on Feb. 12, 2015]. Retrieved from the Internet: <URL: http://onwireco.com/

(56) References Cited

OTHER PUBLICATIONS wp-content/uploads/2013/12/IBM_Security_Access_Manager_For_Enterprise_Single_Sign-On.pdf>, 8 pages.
Impersonate another user: Dynamics CRM 2015. Copyright 2015 Microsoft [retrieved Jun. 25, 2015]. Retrieved from the Internet: <URL: https://msdn.microsoft.com/en-us/library/gg334744.aspx>, 1 page.
Installing vCenter Single Sign-On in a multisite deployment (2034074). kb.vmware.com [online]. Copyright 2014 VMware, Inc. [retrieved Jan. 7, 2015]. Retrieved from the Internet: <URL: http://kb.vmware.com/selfservice/microsites/search.do?language=en_US&cmd=displayKC&externalId=2034074>, 2 pages.
Mortimore, C. and Yewell, E. Implementing Single Sign-On Across Multiple Organizations. developer.salesforce.com [online]. Copyright 2000-2014 salesforce.com, Inc. [retrieved Jan. 7, 2015]. Retrieved from the Internet: <URL: https://developer.salesforce.com/page/Implementing_Single_Sign-On_Across_Multiple_Organizations>, 15 pages.
Multiple Data Centers. support.ca.com [online]. Copyright 2014 CA [retrieved Jan. 7, 2015]. Retrieved from the Internet: <URL: https://support.ca.com/cadocs/0/CA%20SiteMinder%2012%2052%20SP1-ENU/Bookshelf_Files/HTML/idocs/index.htm?toc.htm?706393.html?intcmp=searchresultclick&resultnum=452>, 8 pages.
Oracle Enterprise Single Sign-On Suite Plus 11gR2 PS2. White Paper [online]. Jan. 2014, Oracle Corporation [retrieved on Jul. 30, 2015]. Retrieved from the Internet: <URL: http://www.oracle.com/technetwork/middleware/id-mgmt/esso-suite-technical-whitepaper-1519077.pdf>, 25 pages.
Oracle Fusion Middleware Developer's Guide for Oracle Access Management: Developing an Application to Manage Impersonation. Copyright 2015 Oracle [retrieved on Jun. 26, 2015]. Retrieved from the Internet: <URL: https://docs.oracle.com/cd/E52734_01/oam/AIDEV/impersonation.htm#AIDEV422>, 11 pages.
Oracle Fusion Middleware Developing Web Applications, Servlets, and JSPs for Oracle WebLogic Server: Using Sessions and Session Persistence. Copyright 2015 Oracle [retrieved May 18, 2015]. Retrieved from the Internet: <URL: http://docs.oracle.com/cd/E12839_01/web.1111/e13712/sessions.htm#WBAPP301>, 6 pages.
Oracle Fusion Middleware Performance and Tuning for Oracle WebLogic Server: Tuning Web Applications. Copyright 2015 Oracle [retrieved May 18, 2015]. Retrieved from the Internet: <URL: http://docs.oracle.com/cd/E12839_01/web.1111/e13814/webapptune.htm#PERFM368>, 3 pages.
Rivard, J. Clearing Novell Access Manager Application Sessions. Jan. 26, 2009, NetIQ [retrieved Jun. 13, 2016]. Retrieved from the Internet: <URL: https://www.netiq.com/communities/cool-solutions/clearing-novell-access-manager-application-sessions/>, 4 pages.
Stirpe, P. and Shah, A. Time-out Management in Multi-domain Single Sign-On. Strattagroup.com [online]. Copyright 2005 The Stratta Group [retrieved Jan. 6, 2015]. Retrieved from the Internet: <URL: http://www.strattagroup.com/tsg/pubs/ssotime-out.pdf>, 13 pages.
Symantec Identity: Access Manager. Data Sheet [online]. Copyright 2014 Symantec Corporation [retrieved on Feb. 12, 2015]. Retrieved from the Internet: <URL: http://www.symantec.com/content/en/us/enterprise/fact_sheets/b-symantec_identity_access_manager_DS_21227840>, 2 pages.
Volodarsky, M. asp.net: Fast, Scalable, and Secure Session State Management for Your Web Applications. Copyright 2015 Microsoft [retrieved May 18, 2015]. Retrieved from the Internet: <URL: https://msdn.microsoft.com/en-us/magazine/cc163730.aspx>, 9 pages.
Ye, W. A complete Impersonation Demo in C#.net. Jun. 20, 2013, Code Project [retrieved on Jun. 25, 2015]. Retrieved from the Internet: <URL: http://www.codeproject.com/Articles/125810/A-complete-Impersonation-Demo-in-Csharp-NET>, 12 pages.
U.S. Appl. No. 61/880,335, filed Sep. 20, 2013.
U.S. Appl. No. 61/880,400, filed Sep. 20, 2013.
U.S. Appl. No. 61/880,569, filed Sep. 20, 2013.
U.S. Appl. No. 61/880,598, filed Sep. 20, 2013.
U.S. Appl. No. 14/754,222, filed Jun. 29, 2015.
U.S. Appl. No. 14/135,053 , Final Office Action dated Jul. 6, 2015, 17 pages.
U.S. Appl. No. 14/135,053 , Non-Final Office Action dated Jan. 29, 2015, 16 pages.
U.S. Appl. No. 14/135,053 , Non-Final Office Action dated Nov. 25, 2015, 18 pages.
U.S. Appl. No. 14/135,053 , Notice of Allowance, dated May 20, 2016, 10 pages.
U.S. Appl. No. 14/137,775 , Non-Final Office Action dated May 22, 2015, 10 pages.
U.S. Appl. No. 14/137,775 , Notice of Allowance dated Sep. 16, 2015, 9 pages.
U.S. Appl. No. 14/491,076 , Non-Final Office Action dated Mar. 11, 2016, 13 pages.
U.S. Appl. No. 14/754,222 Non-Final Office Action, dated Dec. 1, 2016, 10 pages.
"User Session Monitoring for CA Single Sign-On," CA Technologies, Copyright 2015 http://www.ca.com/~/media/Files/AddOnServicesComponents/user-session-monitor-for-ca-single-sign-on.pdf, 1 page.
"The art of logging out," KTH Sweden, Apr. 26, 2013 https://www.kth.se/social/group/cas/page/the-art-of-logging-out/, 2 pages.
"IBM Security Access Manager for Enterprise Single Sign-On" retrieved from the Internet Nov. 10, 2016: http://www-03.ibm.com/software/products/en/access-mgr-esso, 2 pages.
"Understanding Jive Mobile's SSO Compliance," Jive Software, Jun. 25, 2012 https://community.jivesoftware.com/docs/DOC-61829, 11 pages.
Haire, A Solution to SSO Authentication and Identity Management: Lessons Learned, Atlassian Blog, May 16, 2013, 5 pages.
U.S. Appl. No. 14/814,209, Non-Final Office Action dated Jan. 11, 2017, 13 pages.
U.S. Appl. No. 14/754,222, Notice of Allowance dated May 17, 2017, 5 pages.
U.S. Appl. No. 14/814,209, Final Office Action dated Jul. 31, 2017, 19 pages.
U.S. Appl. No. 15/143,240, Non-Final Office Action dated Jun. 5, 2017, 11 pages.
U.S. Appl. No. 14/491,076, Notice of Allowance dated Nov. 2, 2017, 11 pages.
U.S. Appl. No. 15/143,240, Final Office Action dated Dec. 15, 2017, 14 pages.
U.S. Appl. No. 15/372,342, Non-Final Office Action dated Oct. 20, 2017, 14 pages.
Dacosta et al., "One-Time Cookies: Preventing Session Hijacking Attacks with Stateless Authentication Tokens", ACM Trans. Internet Technol. 12, 1, Article 1, 2012, 31 pages.
Pujolle et al., "Secure Session Management With Cookies", 7th International Conference on Information, Communications and Signal Processing (ICICS), 2009, pp. 1-6.
Samar , "Single Sign-On Using Cookies for Web Applications", Enabling Technologies: Infrastructure for Collaborative Enterprises, (WET ICE '99) Proceedings. IEEE 8th International Workshops on, Stanford, CA, 1999, pp. 158-163.

* cited by examiner

SINGLE SIGN-ON BETWEEN MULTIPLE DATA CENTERS

CROSS-REFERENCES TO RELATED APPLICATIONS

This application is a continuation application of U.S. application Ser. No. 14/137,775, filed Dec. 20, 2013, which is a non-provisional of and claims the benefit and priority under 35 U.S.C. 119(e) of U.S. Provisional Application No. 61/880,400 filed Sep. 20, 2013, entitled "SINGLE SIGN-ON BETWEEN MULTIPLE DATA CENTERS." The entire contents of the 61/880,400 and Ser. No. 14/137,775 applications are incorporated herein by reference for all purposes.

BACKGROUND

1. Field of the Art

Generally, the present application relates to data processing. More specifically, the application is related to single sign-on for enterprise software spanning data centers in different locations.

2. Discussion of the Related Art

Enterprise computer networks are often spread over different data centers. The data centers can be geographically collocated or dispersed. Using single sign-on (SSO), a user can log into one data center and then access other data centers without logging in. For example, SSO allows a user to enter a username/password once in order to gain access to multiple associated resources.

Traditionally, a user's session information is stored as a cookie on the user's client device, and when the user authenticates to a new data center, the cookie is read by a server of the data center. Storing a user's session information in a cookie places restrictions on the domain name server (DNS) domains of the data centers. For example, all the data centers need to share the same top level domain (e.g., Oracle.com) in order for the SSO authentication using the cookie to work properly. Furthermore, the cookies oftentimes include a large amount of data. Large cookies are often broken up into multiple cookies before being transmitted in packets and are then reassembled once they arrive at their destination. This leads to an increase in network traffic, which can cause latency problems. Moreover, managing the multiple cookies can be an onerous task, adding even further to the complexity of the SSO procedure.

BRIEF SUMMARY

Systems and techniques for providing single sign-on (SSO) capabilities using a minimal set of information are provided. In some examples, systems and techniques may be provided for using a push model for obtaining, at a first data center, a minimal set of information (e.g., one or more unique identifiers in a cookie) from a user client device and using a pull model for obtaining, at the first data center, any additional session information that is needed to fully reconstruct the user session from a second data center. For example, the minimal set of information may include a reference stored in a lightweight cookie identifying the data center that issued an identifier to the client device (an issuing data center). The reference may include one or more unique identifiers that can be used by a requesting data center to contact the issuing data center in order to obtain any required information that is needed to reconstruct the session for the user.

In some instances, the previous data center may be unavailable for providing the required information to the requesting data center. In such instances, the requesting data center may fall back to accessing a local security store, which may include the required information, in order to create a session for the user on the requesting data center.

According to at least one example, a computer-implemented method for single sign-on (SSO) access among data centers may be provided that includes receiving, at a first data center, a single sign-on authentication cookie from a client device, the cookie including a reference to a second data center with which a user of the client device has been successfully authenticated. The method may further include building, at the first data center, a session retrieval request based on the reference included in the authentication cookie and sending, from the first data center, the session retrieval request to the second data center based on the reference included in the authentication cookie.

In some embodiments, a system of a first data center may be provided that includes a memory storing a plurality of instructions and one or more processors. The one or more processors may be configurable to execute the plurality of instructions to receive a single sign-on authentication cookie from a client device, the cookie including a reference to a second data center with which a user of the client device has been successfully authenticated. The one or more processors may be further configurable to execute the plurality of instructions to build a session retrieval request based on the reference included in the authentication cookie and to send the session retrieval request to the second data center based on the reference included in the authentication cookie.

In some embodiments, a computer-readable medium storing a plurality of instructions executable by one or more processors of a first data center may be provided. The plurality of instructions may cause the one or more processors to receive a single sign-on authentication cookie from a client device, the cookie including a reference to a second data center with which a user of the client device has been successfully authenticated. The plurality of instructions may further cause the one or more processors to build a session retrieval request based on the reference included in the authentication cookie and send the session retrieval request to the second data center based on the reference included in the authentication cookie.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

The foregoing, together with other features and embodiments, will become more apparent upon referring to the following specification, claims, and accompanying drawings.

DETAILED DESCRIPTION

Figure 1:
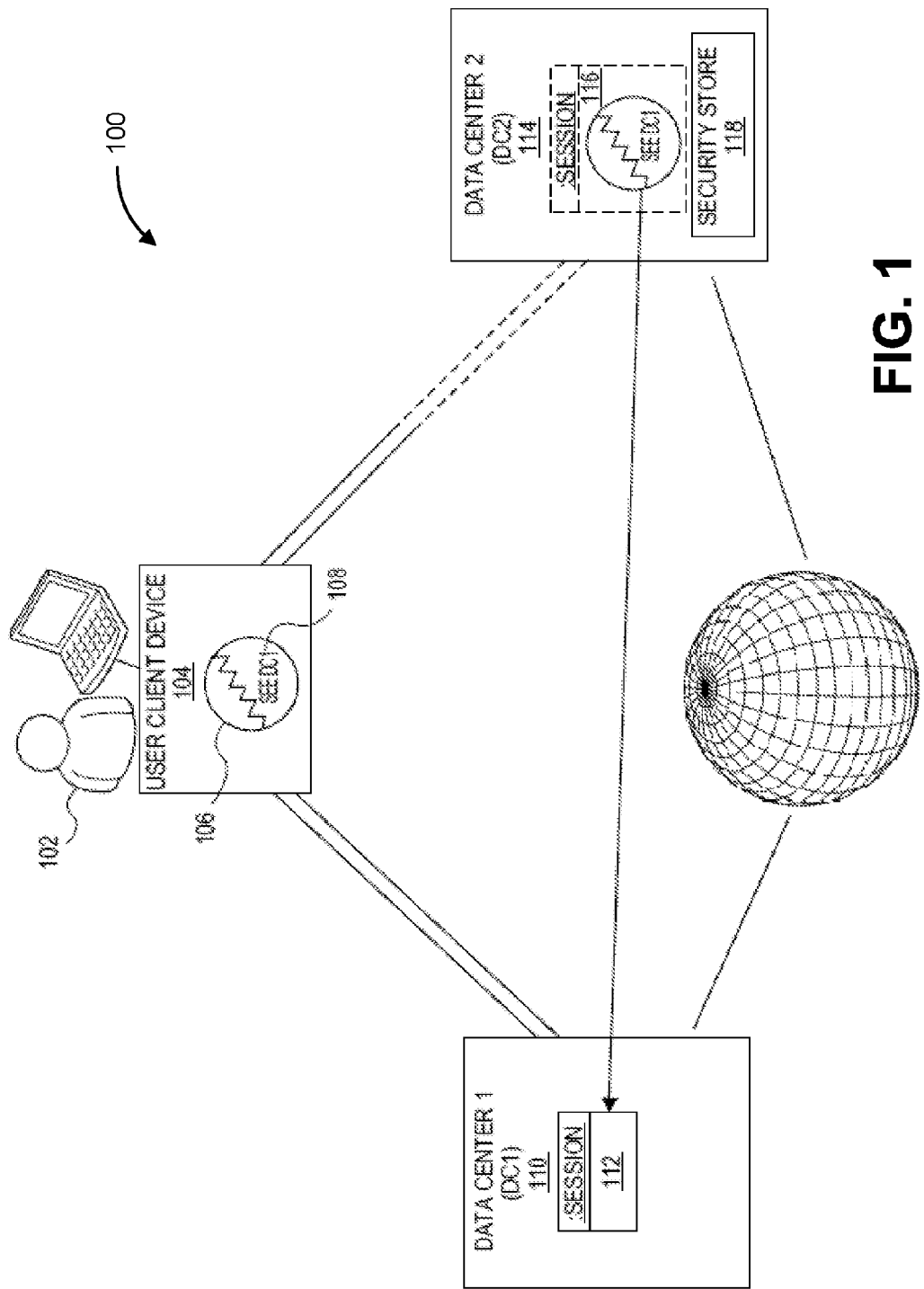
FIG. 1 illustrates a system for providing single sign-on access among data centers in accordance with an embodiment.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to, portable or non-portable storage devices, optical storage devices, wireless channels, and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

Enterprise computer networks may be used to meet the computing needs of one or more organizations, such as businesses, universities, government organizations, or the like. The enterprise computer network infrastructure may be spread over different data centers that may be dispersed over different geographic locations. Various resources included within an enterprise computer network may be managed and/or stored by the different data centers. For example, a first resource may be stored and managed by a first data center and a second resource may be stored and managed by a second data center. Resources may include any item managed and/or stored by the data centers and available for access by one or more users, such as an application, a document, a file, and/or the like. A user may have to be authenticated and authorized by the first data center in order to access the first resource and may have to be authenticated and authorized by the second data center in order to access the second resource. The enterprise computer network may offer a single sign-on (SSO) functionality that allows a user to log into one data center and then access other data centers using the same authentication session without re-logging in each time a different data center is accessed. For example, SSO allows a user to enter a username/password once in order to gain access to multiple resources located across different data centers.

A session is created for a user at each data center when the user is authenticated and/or authorized by each data center. The user's sessions are coordinated among the various data centers as the user accesses different resources dispersed among the data centers. Information relating to a user's session is traditionally stored as a cookie on the user's client device. For example, when a user authenticates to a given data center in order to access a resource stored and/or managed by the data center, a user session object may be created and a cookie may be stored on the client device. The cookie may include a time at which the user was authenticated, privileges that have been assigned to the user, various identifiers of data centers, and/or the like. When the user authenticates to a new data center to access a different resource stored and/or managed by the new data center, the cookie is received by the server of the new data center from the user's client device. However, as described above, storing a user's session information in a cookie places restrictions on the domain name server (DNS) domains of the data centers (e.g., the cookies only work within a single domain), leads to an increase in network traffic, and adds to the complexity of the SSO procedure. Accordingly, various systems and techniques are needed for providing SSO access among data centers using a lightweight cookie that is stored at the client device and that includes a minimal amount of data instead of the entire user session information data.

In some embodiments, systems, methods, and computer-readable media are disclosed for providing single sign-on (SSO) in an enterprise system with multiple data centers using a lightweight cookie on a client device. The lightweight cookie may be stored on the client device after a user of the client device is authenticated on a first data center. The lightweight cookie may include, for example, reference data relating to the data center in which the user has already been authenticated, such as an identifier relating to the first data center. When a user attempts to access a resource stored and/or managed by a new data center, the new data center may obtain the lightweight cookie from the client device and may read the reference data identifying the first data center. Based on the reference data, the new data center may contact the previous data center in order to authenticate the user and/or to receive session information for creating a session for the user on the new data center. The data regarding the user's session is transmitted quickly between the two data centers.

FIG. 1 illustrates a system 100 for providing single sign-on access among a group of data centers within an enterprise computer network. A user 102 operating a client device 104 may access an enterprise computer network with infrastructure distributed across various geographcially dispersed data centers, such as data center 110 and 114. The client device 104 may be a workstation, personal computer (PC), laptop computer, smart phone, wearable computer, or other networked electronic device. The data centers 110 and/or 114 may include applications, web gates, and one or more access manager servers, along with other infrastructure, such as identity stores, databases, or the like. The applications may include the software needed to operate the enterprise computer network according to the organizational customer.

A web gate may provide employee access control and may operate to protect the data center and any resources within the data center against external and internal web-based threats. For example, a web gate may include an agent component and a server side component. Each resource is protected through an agent of the web gate. Each agent may be associated with a particular data center with which the resource is stored and/or managed. The associated data center for an agent may be referred to as the web gate agent's end point. The web gate agent may intercept user requests for one or more resources protected by it and check for user credentials in order to authenticate the user. The agent may then contact an access manager server to verify whether the resource is a protected resource that requires credentials for access. If the access manager indicates that the resource is not protected, the agent will grant access to the user. If the resource is protected, the agent will challenge the user for credentials.

An access manager server enables SSO functionality within the data center and may perform various session related functions for managing access to the corresponding data center. For example, the access manager server may perform authentication and/or authorization of the client device when a user attempts to access one or more resources within the data center. Authentication is the process of proving that a user is who the user claims to be. To authenticate a user, the access manager server (e.g., using a web gate) may present a user with a request for authentication credentials in the form of a challenge (e.g., via the user's web browser). Authentication policies may specify the authentication methodology to be used for authenticating the user for whom the access must be provided on a given resource. The policies define the way in which the resource access is to be protected (e.g., type of encryption, or the like). Authorization is the process of determining if a user has a right to access a requested resource. Authorization policies may be defined that specify the conditions under which a user or group of users has access to a resource. For example, an administrator may only authorize certain users within a group to access particular resources.

An access manager server may receive and analyze cookies from client devices and/or session information from one or more data centers. An access manager may also manage session policies, which may include policies relating to re-authentication, session invalidation, and/or session retrievals. As used herein, "re-authentication" refers to a situation in which a user must re-enter credentials in order to be authenticated anew. "Session invalidation" may refer to the invalidation of sessions that may exist for a user in data centers other than the data center with which the user is currently interacting. In some embodiments, invalidation of a user session may include terminating the remote user session through a front-channel or back-channel operation. For example, front-channel communications may use a hypertext transfer protocol secure (HTTPS) protocol while a back-channel operation communication may use an open access protocol (OAP), or vice versa. In some embodiments, only back-channel invalidation of a user session are supported. As used herein, "session retrieval" or "on-demand session retrieval" may refer to the retrieval of session information from a remote data center before the creation of a local user session in a servicing data center. Session retrieval may be needed to ensure that dynamic session information is not lost when a user moves across data centers. Session retrieval may also ensure timeout information is tracked consistently across data centers so that a user is properly timed-out of a session when appropriate. Retrieval of session information may be done using a front-channel or back-channel operation.

In some embodiments, multiple access manager servers can be deployed as an access manager cluster in a data center, which allows for scalability and high availability. Multiple such geographically dispersed data centers with access manager clusters can be connected (wired or wirelessly) to constitute an access manager Multi Data Center (MDC). An access manager MDC satisfies high availability, load distribution, and disaster recovery requirements of access servers within an enterprise computer network. The MDC may act as a single logical access server and provides single sign on functionality for all of the resources registered in the MDC. To achieve SSO across the data centers, back end user sessions need to be migrated from the originating data center to the data center that is servicing the user. Synchronization of the databases among the data centers may not be practical due to latencies involved in transmitting data between the geographically dispersed databases. Accordingly, migration of user sessions may be accomplished using on demand session migration or session retrieval from each data center.

A data center may identify each user session uniquely by generating a session identifier. When the system is operated as a MDC, a user request for one or more resources can hop across data centers within a single SSO session, requiring all the visited data centers to generate unique identifiers for servicing the user request. In some embodiments, the access manager server may use a session management engine to generate this unique session identifier per user per data center.

Referring again to FIG. 1, a user 102 may request access to one or more resources, which may be stored and/or managed by data center 110. In response, the access manager server or a web gate within the data center 110 may present the user 102 with a request for authentication credentials (e.g., user name/password, or the like). In some embodiments, some resources within the data center 110 may not protected, in which case the access manager server or the web gate may first query the access manager server to determine if the requested resource is protected. If a web gate is used, the web gate may then forward the credentials to the access manager server. The access manager server authenticates the user 102 upon receiving the proper credentials by validating the credentials against those stored in a user directory. As a result, the user 102 is logged into the data center 110 and a session is created for the user in the data center 110 with a session identifier (ID) S1. The session is represented by session object 112. Once logged in, the user 102 may access resources for which the user is authorized to access, such as running different applications, accessing cloud storage, or the like. The user 102 may communicate using the client device 104, which communicates with the data centers 110 and 114 using a particular protocol (e.g., hypertext transfer protocol (HTTP) or hypertext transfer protocol secure (HTTPS)). The protocol may be determined based on the type of resource. For example, an HTTPS request may be required to request sensitive or confidential resources.

Once the user 102 is logged into the data center 110, the access manager server creates a session object 112 representing the session and a lightweight cookie 106. The session object 112 is stored in the data center 110 and the lightweight cookie 106 is stored on the client device 104. The user's session is tracked by the data center using the session object 112 in the data center 110 and the lightweight cookie 106 in the client device 104. The lightweight cookie 106 includes a reference 108 to the data center 110, which will be described in detail below. The session object 112 may include, for example, user name, user ID, one or more user preferences, or the like. In some embodiments, the session object 112 may also include an IP address, an estimated geographic location of the user, preferred language, preferred locale, type of client device 104, version of an operating system on the client device 104, other information about the client device 104, or the like. In some embodiments, the session object may also include a length of time that the user has been on a particular web site and the number of times that the user may have previously accessed a particular web site.

The user 102 may then request a second resource on the enterprise network. For various reasons, the user 102 request for the second resource may be directed to the data center 114 instead of the data center 110 in which the user was originally authenticated. For example, the resource requested by the user 102 may be stored and/or managed by the data center 114 and not by the data center 110. As another example, the user 102 request may be directed to the data center 114 in the event a load spike occurs and the data center 110 cannot handle the request. Data center 114 is in a different geographic part of the world than data center 110, in which user 102 currently has a session. Upon attempting to access the second application, data center 114 first determines that the user 102 does not yet have a session on data center 114. In some embodiments, when the request reaches data center 114, MDC policies of the MDC (explained further below) may identify that a multi data center scenario exists and that a valid session is not present in the data center 114. Prior to asking the user 102 to provide credentials for authentication, the data center 114 (e.g., access manager server of data center 114) may check the user's 102 client device 104 for a lightweight cookie. Instead of including in the lightweight cookie 106 all session information required to create a session on data center 114, the lightweight cookie 106 contains one or more references to a data center with which the user is authenticated. An example a lightweight cookie includes:

[USERID:weblogic; IdStoreRef:oid1; SessionStartTime: 1377857989521; LastAccessTime:1377857991298; ClusterID:fd4df-rws3510246.u; LastVisitedClusterId:fd4df-rws3510246.u; fd4df-rws3510246.u:5cead900-d9ec-47a3-accb-98255dbb621a]

The lightweight cookie includes a minimal set of information that can be used by a disparate data center (e.g., data center 114) to identify and contact data center 110 in order to obtain session information that allows the disparate data center to create a local session object. For example, the "USERID: weblogic" is a user identifier that is specific to the user 102. The "IdStoreRef:oid1" indicates a directory (e.g., a lightweight directory access protocol (LDAP) ID store) that is used to store and retrieve the user's identity information relating to the session. The "SessionStartTime: 1377857989521" indicates when the session started. The first three entries in the lightweight cookie 106 may remain static and not change as the user 102 accesses different resources and/or data centers. The remaining entries may change based on the user's activity. The "LastAccessTime: 1377857991298" indicates the last time the user 102 accessed a resource stored and/or managed by a data center within the network of data centers (e.g., data centers 110 or 114). The "ClusterID:fd4df-rws3510247.u" indicates the data center for which the user 102 is currently connected, which is data center 114. For example, each data center may be identified by a unique cluster ID. In some embodiments, a cluster ID may include a name of the data center (e.g., "data center 114") instead of an alphanumeric string. The "LastVisitedClusterId:fd4df-rws3510246.u" indicates the last data center for which the user 102 previously connected, which is data center 110. The last visited cluster ID may also be the name of the last visited data center (e.g., "data center 110"). The last visited cluster ID is used by the data center 114 to contact and fetch the latest session information from the most recently visited cluster, in this case data center 110. Session information may include, for example, a last access or update time, client device IP address, partner data/agent ID indicating that the particular resource is protected by a particular agent, or the like. In some embodiments, the cluster ID and last visited cluster ID may be the same if the most recent two requests were routed to the same data center. The final entry, "fd4df-rws3510246.u:5cead900-d9ec-47a3-accb-98255dbb621a," is the session identifier of the last visited data center 110.

In some embodiments, a lightweight cookie may be updated each time a session is created in a data center. In some cases, the lightweight cookie may be augmented when a session is created at a data center to update the cookie with a cluster ID and a session ID of that data center. For example, after visiting two data centers, the lightweight cookie may be augmented to include the cluster ID:session ID combination for both the data centers, such as "DC1:S1" and "DC2:S2." The lightweight cookie entry "LastVisitedClusterId" may also be updated to include the reference of the last accessed or visited data center. The last visited cluster ID entry and the cluster ID:session ID combinations included within the lightweight cookie may be used by a newly accessed data center to determine which data center and session ID to reference in order to set up a session for the user in the newly accessed data center. For example, if the newly accessed data center reads a lightweight cookie that has the mapping as "DC1:S1,DC2:S2" and "LatestVisitedClusterId:DC1", the newly accessed data center knows that the last accessed/updated session is S1 on DC1.

The data center 114 may read the cookie 106 from client device 104 and find reference data 108. The data center 114 may determine from the reference 108 within the lightweight cookie 106 whether a prior request from the user 102 has previously been directed to any other data centers and resulted in creation of a valid session in one of the data centers. The reference 108 may include one or more of the entries of the example lightweight cookie described above. For example, the reference 108 may include the last visited cluster ID of data center 110 and the session identifier of the last visited data center 110. As explained above, the last visited cluster ID entry and the cluster ID:session ID combinations included within the lightweight cookie may be used to determine which data center and session ID to reference. Based on the reference 108 in the lightweight cookie 106, the data center 114 will determine that the user 102 has previously visited data center 110 and that a valid session exists for the user 102 in data center 110. The data center 114 may then query the data center 110 and authenticate the user by validating that a valid session is available in the data center 110. For example, the data center 114 may build a session retrieval request that can be sent to data center 110. An example of a session retrieval request includes:

readSession=oamMdcRemoteDCPartner.readSession(sessionID, sessionDetails, status);

where,

- 'readSession' is the Boolean value; 'true' if a valid 'sessionID' is found in the remote DC; otherwise false.
- 'oamMdcRemoteDCPartner' is the registered MDC partner to be used to communicate with the Remote DC.
- 'sessionID' is the session identifier in the remote DC from which the 'sessionDetails' to be read.
- 'sessionDetails' is the output value which will be populated with session details for the given 'sessionID'.
- 'status' is the output value to hold Major and Minor codes returned by Remote DC server.

Once it is verified that a valid session exists in data center 110, one or more policies applicable to the data center 114 may direct the data center 114 to create a new session and to provide SSO access for the user 102 to the particular resource. The data center 114 may direct the data center 110 to send session information relating to the session 1. For example, the session retrieval request may direct the data center 110 to respond with session information from session object 112 in the event a valid session exists in data center 110. Once the data center 114 receives the session object 112, it may read the session information from session object 112 and may use the information to create a local session within data center 114 with session ID 2 and session object 116. The local session object 116 may then be instantiated and/or initialized in order to authenticate the user 102. Once authenticated, the user 102 may access the second resource stored and/or managed by data center 114. After session 2 is created in data center 114, the lightweight cookie may be updated to include, for example, the cluster ID and the session ID of data center 114.

In some embodiments, once the data center 114 determines that a request from the user 102 was previously directed to data center 110 based on information in the lightweight cookie 106, one or more MDC policies may be used to create the session at data center 114. The MDC policies may be set up by an administrator of the enterprise computer network. For example, an MDC may have a set of policies that apply to all data centers within the MDC. A new session may then be created according to the one or more applicable MDC policies. The policies may be stored in a data center configuration file with configuration values indicating whether one or more available policy options are applicable to the MDC.

One example policy may include an on-demand session retrieval policy. If an on-demand session retrieval policy is selected to apply to the MDC, the data center 114 may be required to verify that a session is valid in the data center 110 (session with session ID S1). Once session S1 is verified, the data center 114 fetches corresponding session information from data center 100 and assigns the session information to the new session S2 that will be created in the data center 114. Assigning the session information to the new session ensures that both of the sessions S1 and S2 are in synchronization with one another.

Another example policy may include whether a session must be anchored to the data center servicing the user. This type of policy requires that only one active session is allowed for a particular user across the data centers within the MDC. If this policy is selected to apply to the MDC, then after data center 114 performs session retrieval (validating session 1 and fetching the session information for use in creating session 2 in data center 114) and creates session 2, the session 1 in data center 110 is terminated so that only session 2 is active for user 102.

A third example policy may include a reauthenticate policy. A reauthenticate policy indicates that whenever a user is directed to a data center for the first time, that user is required to enter credentials for authentication, regardless of a valid session existing in another data center. For example, even though user 102 has valid session 1 in data center 110, the user will be required to reauthenticate in order to access resources stored and/or managed by data center 114. A reauthentication policy can be set to apply to particular data centers and/or particular resources. For example, the policy for certain sensitive documents stored and/or managed by a data center may require that a user reauthenticates to the data center each time the document is accessed.

A fourth example policy may include a session continuation on sync failure policy. This policy may direct a data center to proceed to authenticate the user even if session information cannot be fetched from a remote data center. For example, when the user 102 is directed to data center 114 for the second resource, data center 114 will attempt to fetch session information from data center 110 based on the lightweight cookie 106. However, for some reason, the data center 114 may not be able to communicate with data center 110 (e.g., due to a high load at data center 110, network delay, or the like) and thus will not be able to fetch or synchronize its session information with that from the data center 110. In these cases, if the session continuation on sync failure policy flag is set to apply to the MDC, the data center 114 may proceed to create a session for the user 102 without synchronizing with the data center 110.

By using a lightweight cookie that includes only enough data to allow a data center to identify and contact remote data centers for session information, network traffic and the amount of data stored on the client device 104 is minimized. Furthermore, the lightweight cookie allows for single sign-on to be achieved between multiple data centers that are not of the same domain. For example, a domain traditionally only has access to the data in cookies that the domain issued (e.g., host cookies, which are described further below). As a result, a first data center in a different domain than a second data center that issued a cookie cannot read data within the cookie. Because the first data center cannot read the cookie, it does not recognize the user as already having been authenticated in another data center. The lightweight cookie described herein (with references between data centers) allows the first data center to determine from the existence of the cookie that the user is already logged in on another data center. The first data center can then determine which data center the user is already logged into and may poll that data center directly for the user's data.

Figure 2:
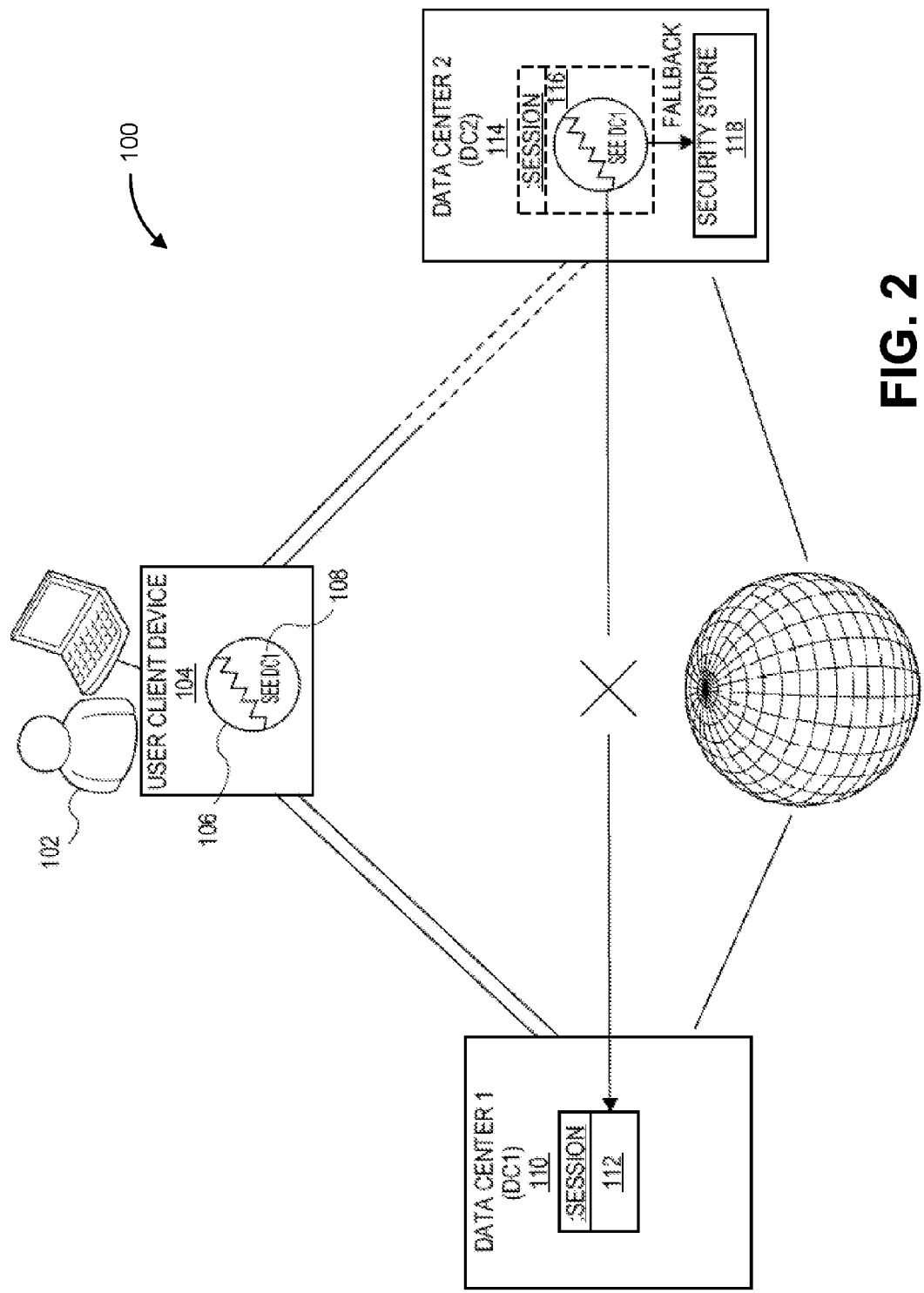
FIG. 2 illustrates a system for providing single sign-on access among data centers using a local security store in accordance with an embodiment.

FIG. 2 illustrates the system 100 for providing single sign-on access among data centers using a local security store in the event communication between data centers 110 and 114 is faulty. For example, the data center 110 may be unable to provide the session information to the new data center. For example, a network error condition may occur that prevents communication between the data centers. In another example, a high load condition may occur at data center 110, which prevents the data center from having the bandwidth to communicate with data center 114. In the event communication between data centers 110 and 114 cannot be made, data center 114 may perform a fall back procedure in order to fall back to an offline approach by accessing a local security store 118 within the data center 114. The local security store 118 may include enough session information to enable the data center 114 to create a local session for the user on the data center 114.

As illustrated in FIG. 2, client device 102 may authenticated using a local security store in accordance with an embodiment. For example, data center 114 is unable to connect with data center 110 and cannot collect session information from data center 110 regarding session 112. In order to allow a fall back procedure to be implemented in the event communications between data centers 110 and 114 fails, data center 114 may periodically and regularly (e.g., on the order of seconds, minutes, or the like) receive various data, such as login keys, security tokens, and/or other data from data center 110. This data is collected and stored in the security store 118, which is a part of data center 114.

After having failed in its attempt to contact data center 110 for session data relating to session 112, the data center 114 accesses its own local security store 118 in order to obtain data for creating session 116. If successful, session 116 is created for user 102 in data center 114.

In some embodiments, the local security store 118 may not have data sufficient to create a session for user client device 104. In such embodiments, the user 102 may be challenged for credentials in order to re-authenticate the user 102. For example, the client device 104 may be sent a prompt for the user's username, password, and/or other authentication data.

While the security store 118 may include enough information so that a valid session can be created for the user 102 in data center 114, obtaining session information from data center 114 (when possible) results in a more robust SSO session for the user amongst the data centers within the MDC. For example, the sessions in data center 110 and 114 may not be synchronized if the security store 118 is used. Accordingly, the security store 118 may only be used in the event communication between data centers 110 and 114 is unable to occur.

Figure 3:
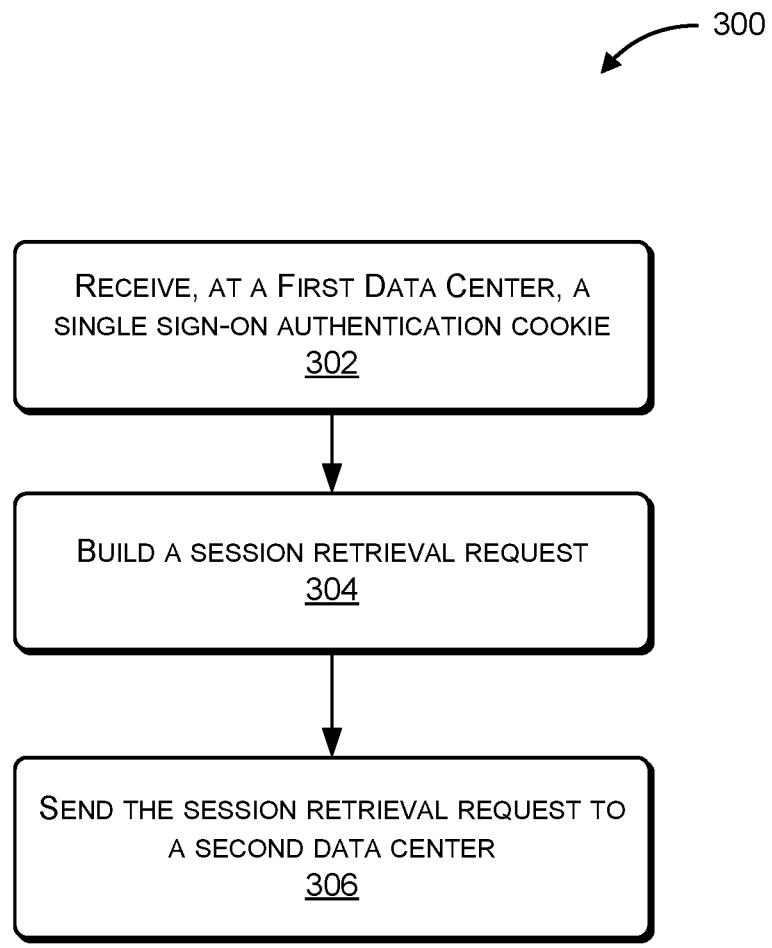
FIG. 3 illustrates a flowchart of an embodiment of a process for single sign-on access among data centers in accordance with an embodiment.

FIG. 3 illustrates an embodiment of a process 300 for single sign-on access among data centers. Process 300 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 300 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

In some aspects, the process 300 may be performed by a computing device, such as the data center 114 or the data center 110 shown in FIG. 1, the server 612 shown in FIG. 6 below, the cloud infrastructure system 702 shown in FIG. 7 below, or the computer system 800 shown in FIG. 8 below.

Process 300 may begin at 302 by receiving a single sign-on authentication cookie. The single sign-on authentication cookie may be received at a first data center from a client device and may include a reference to a second data center with which a user of the client device has been successfully authenticated and/or authorized. For example, the user 102 may request a resource stored and/or managed by the data center 114. In response, the request may be directed to the data center 114. Upon receiving the request, the data center 114 may receive the lightweight cookie 106 with reference 108 from the client device 104. The reference 108 of the lightweight cookie 106 may include a reference to the data center 110 with which the user has an existing session based on a previous authentication and authorization. The reference to the second data center may include one or more of the entries of the example lightweight cookie described above. For example, the reference may include the last visited cluster ID of data center 110 and the session identifier of the last visited data center 110.

At 304, the process 300 includes building a session retrieval request based on the reference included in the authentication cookie. The session retrieval request may be built by the first data center and may include the example session retrieval request described above with respect to FIG. 1. At 306, the process 300 includes sending the session retrieval request to the second data center based on the reference included in the authentication cookie. The session retrieval request may be sent from the first data center.

The process 300 may further include receiving, at the first data center, session data from the second data center in response to the session retrieval request. The first data center may then initialize a session object with the session data from the second data center sufficient to authenticate and/or authorize the user client device at the first data center.

In some embodiments, the process 300 further includes terminating a session of the user at the second data center based on the initializing of the session object at the first data center. For example, an anchored to the data center servicing the user policy may apply to the MDC for which the first and data center are a part, which requires that only one active session is allowed for a particular user across the data centers within the MDC. Accordingly, the session at the second data center may be terminated in order to satisfy the policy. In some embodiments, the terminating is based upon an administrator preference to have only one active user session at a time in the data centers. The administrator may implement their preference by applying the anchored to the data center servicing the user policy to the MDC.

In some embodiments, the process 300 may include terminating a session of the user at the second data center and the session object at the first data center in response to the user logging out of the first data center. For example, as described in further detail below, a logout policy may apply to the MDC that ensures all server side sessions across data centers within the MDC and associated with the SSO across the data centers, as well as any authentication cookies, are cleared out.

In some embodiments, the process 300 may include prompting, from the first data center, the user for authentication credentials based on an administrator preference. For example, an administrator may apply a reauthenticate policy to the MDC, which indicates that whenever a user is directed to a data center for the first time, that user is required to enter credentials for authentication regardless of a valid session existing in another data center. For example, even though user 102 has valid session 1 in data center 110, the user will be required to reauthenticate in order to access resources stored and/or managed by data center 114.

In some embodiments, the process 300 may include a fall back procedure in the event communication between the data centers is unable to occur. For example, the process 300 may include determining, by the first data center, that the second data center cannot respond to the session retrieval request and determining, by the first data center, that a local security store of the first data center includes session data previously replicated from the second data center. If it is determined that a local security store includes the session data, the first data center may read, from the local security store, the session data previously replicated from the second data center. The process 300 may then include initializing, by the first data center, a session object with the session data from the local security store sufficient to authenticate the user client device at the first data center.

In some embodiments, the process 300 may attempt to access a local security store and determine that the local security store does not have sufficient session data. For example, the process 300 may include determining, by the first data center, that the second data center cannot respond to the session retrieval request and determining, by the first data center, that a local security store of the first data center does not have sufficient session data for the client device replicated from the second data center. In response, the process 300 may prompt, from the first data center, the user for authentication credentials. The process 300 may then receive, at the first data center, authentication credentials from the user in response to the prompt and initializing, at the first data center, a session object using the received authentication credentials.

Figure 4:
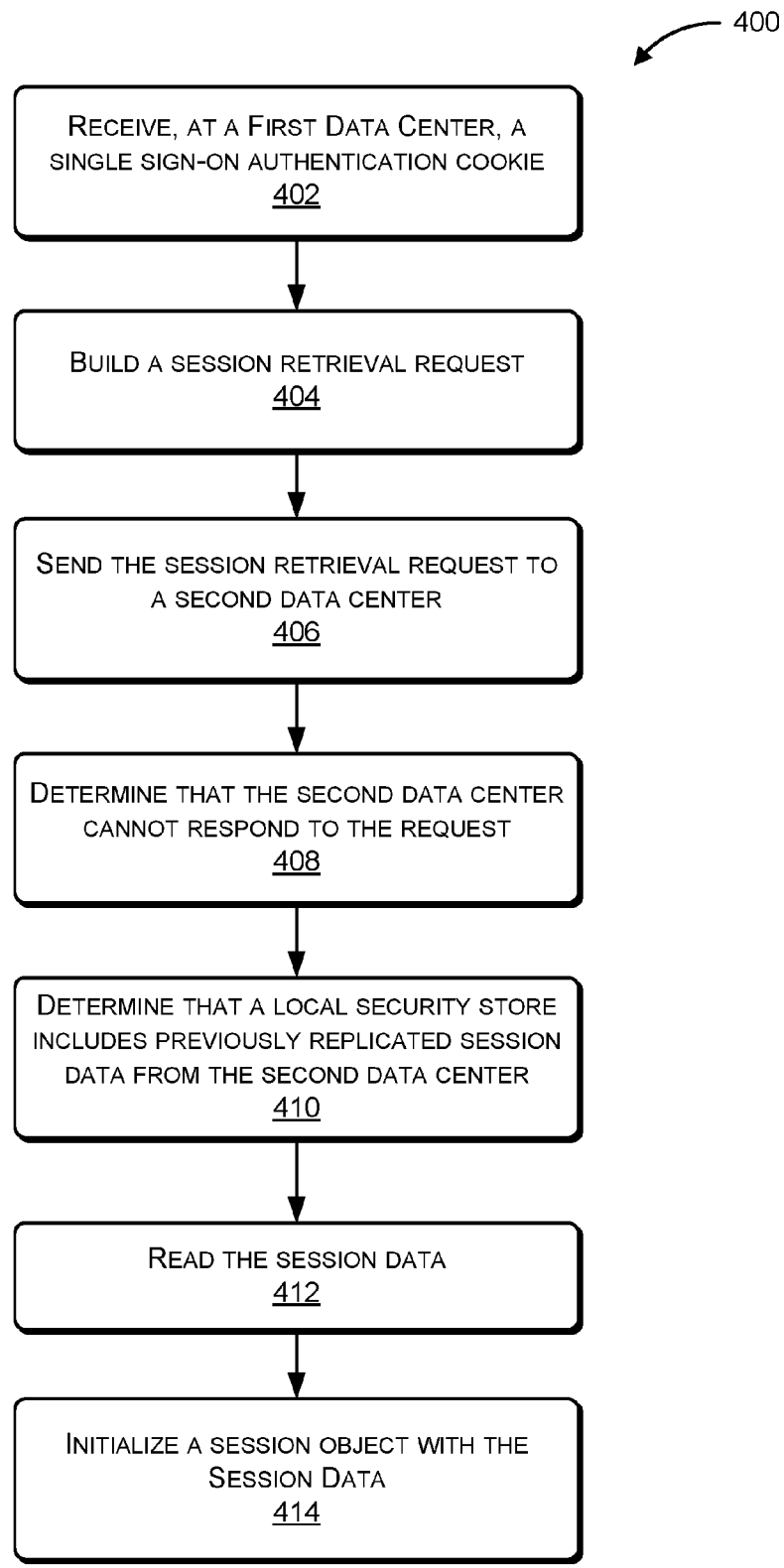
FIG. 4 illustrates a flowchart of an embodiment of a process for single sign-on access among data centers using a local security store in accordance with an embodiment.

FIG. 4 illustrates an embodiment of a process 400 for single sign-on access among data centers using a local security store. Process 400 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 400 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

In some aspects, the process 400 may be performed by a computing device, such as the data center 114 or the data center 110 shown in FIG. 1, the server 612 shown in FIG. 6 below, the cloud infrastructure system 702 shown in FIG. 7 below, or the computer system 800 shown in FIG. 8 below.

Process 400 may begin at 402 by receiving a single sign-on authentication cookie. The single sign-on authentication cookie may be received at a first data center from a client device and may include a reference to a second data center with which a user of the client device has been successfully authenticated and/or authorized. For example, a request from the user 102 for a resource may be directed to the data center 114 that stores and/or manages the resource. The data center 114 may obtain the lightweight cookie 106 with reference 108 from the client device 104 in response to the request. The reference 108 of the lightweight cookie 106 may include a reference to the data center 110 with which the user has an existing session based on a previous authentication and authorization. The reference to the second data center may include one or more of the entries of the example lightweight cookie described above.

At 404, the process 400 includes building a session retrieval request based on the reference included in the authentication cookie. The session retrieval request may be built by the first data center and may include the example session retrieval request described above with respect to FIG. 1. At 406, the process 400 includes sending the session retrieval request to the second data center based on the reference included in the authentication cookie. The session retrieval request may be sent from the first data center.

At 408, the process 400 may determine that the second data center cannot respond to the session retrieval request. The determination may be made by the first data center. In response to determining that the second data center cannot respond to the session retrieval request, the first data center may perform a fall back procedure in order to create a session for the user in the first data center. At 410, the process 400 includes determining that a local security store of the first data center includes session data previously replicated from the second data center. The determination may be made by the first data center. In the event it is determined that a local security store includes the session data previously replicated from the second data center, the process 400 reads the session data from the local security store at 412. At 414, the process 400 then initializes a session object with the session data from the local security store. The session data is sufficient to authenticate the user client device at the first data center. The initialization may be performed by the first data center.

In some embodiments, the process 400 may attempt to access a local security store and determine that the local security store does not have sufficient session data. In response, the process 400 may prompt, from the first data center, the user for authentication credentials. The process 400 may then receive authentication credentials from the user in response to the prompt. In the event the credentials are validated, the process 400 may initialize a session object using the received authentication credentials.

In some embodiments, various other cookies may be maintained within the MDC in order to allow SSO capabilities in accordance with the systems and techniques described above. The session information used to create a session may be included in one or more of these cookies. These cookies may be passed back and forth between data centers and user client devices. For example, an access manager ID cookie may be provided, which is the SSO cookie for an access manager server and carries additional attributes required to enable multiple data center behavior across the data centers of a MDC. For example, when a user session gets created in a data center, the access manager ID cookie will be augmented with the cluster ID of the data center. In some embodiments, if multiple sessions exist for a user at multiple data centers, each of the cluster IDs of the data centers may be included in the access manager ID cookie. In addition, a 'latest_visited_clusterid' entry may be updated to the current cluster ID for a data center with which a user is connected.

If a subsequent request from the user in the same SSO session hops to a different member data center, multiple data center session adoption will be triggered as per the configured session adoption policies. As used herein, "session adoption" may refer to a data center creating a local session based on the submission of a valid authentication or lightweight cookie that indicates a valid session for the user exists in some other data center. Session adoption may or may not involve reauthentication of the user, depending on whether the reauthenticate policy is active. The contents of the access manager ID determine from where to synchronize the session. After the session adoption, the access manager ID will be updated with the cluster ID and session ID of the data center servicing the current request.

In some embodiments, the access manager ID cookie is a host cookie by default. IN some embodiments, the access manager ID cookie can also be configured as domain cookie based on deployment requirements. Configuring the access manager ID as a domain cookie may eliminate the requirement of setting up a global load balancer across data centers to manage the access manager ID host cookie.

An access manager authentication (authn) cookie and a obsso cookie may also be provided. An authn cookie and an obsso cookie are different versions of cookies for different versions of web gates. For example, SSO support for multiple domains may supported in an access manager with the help of web gate agents. An web gate agent is free to be from any domain. When a user attempts to access a resource protected by an agent with domain 'x,' the agent may trigger access control, which results in authentication by the access manager server of a data center that stores and/or manages the resource. Upon successful authentication, access the manager server may set the access manager ID cookie and the agent may set the access manager authn cookie (AM-Authn-x). Both of access manager ID cookie and the access manager authn cookie may be host cookies, meaning that only the host data center that set the cookie can read them. The user may then attempt to access another resource protected by the same access manager server through a second web gate agent with domain 'y.' The second agent may trigger the access control, resulting in an authentication request to the access manager server of the data center. The access manager ID cookie already present in the user's client device (e.g., a browser of the client device) may let the authentication through at the access manager server. The second agent may then set the access manager authn cookie (AMAuthn-y).

In some embodiments, a looping issue may occur when authentication and authorizations processes continuously occur without ever authorizing the user. For example, a user has an affinity to a particular data center based on the user's location. The data center for which the user has affinity (which may be referred to as an "affinity data center") will always perform authentication of the user. For example, a web gate agent that protects a requested resource may always direct a user's request for that resource to the affinity data center for authentication regardless of whether the data center is the end point for that web gate agent. The user will be granted access by successfully authenticating against the affinity data center. If the end point for the user agent was the affinity data center, the access manager ID cookie is augmented with a unique data center identifier (e.g., cluster ID) referencing the affinity data center and the newly created session ID S1 in the affinity data center. The web gate agent for the requested resource will then set an access manager authn cookie with the cookie contents received from the affinity data center, which will result in the access manager authn cookie having S1 as the session identifier. In the case of the affinity data center being the end point for the web gate agent, the affinity data center successfully authorizes the user because the affinity data center has a valid session with the S1 identifier. However, if the end point for the agent is a second data center, the affinity data center will seamlessly authenticate the user by locating S1 present in the incoming access manager ID cookie, but authorization may not be successful. For example, the web gate agent will send the request to the second data center for authorization after the authentication is completed at the affinity data center. The end point data center will then attempt to authorize the user by checking if a valid session exists on the data center. For example, the web gate may set an access manager authn cookie with the cookie contents received from DC1, resulting in the authn cookie being set with S1 as the session identifier. When the end point data center attempts to authorize the user, authorization fails since the end point data center cannot locate a valid session S1 due to S1 being present only in DC1. If it is determined that a session does not exist, the request will be sent back to the affinity data center for authentication. This creates a looping issue because the request will continuously be transferred between the data centers for authentication and authorization.

To address the looping issue, the multiple data center session adoption may need to be supported during authorization so that a session is created in the end point data center during authorization as opposed to only during authentication. To facilitate this, the web gate cookie (authn or obsso cookie) may be constituted additionally with the clusterid of the servicing data center. If authentication followed by authorization spans across data centers, as in the looping example above, the data center authorizing the user request (the end point data center) will trigger the multiple data center session adoption by retrieving the session's originating 'clusterid' info from the access manager authn cookie. After adopting and/or synchronizing the session, a new session will be created in the data center authorizing the user request (the end point data center) with the synchronized session details.

Another type of cookie that may be provided is an access manager Global Inactivity Time Out (GITO) cookie. The access manager GITO cookie may be a domain cookie set as an authorization response in order to address various issues. For example, the session details of the authentication process will be recorded in the access manager ID cookie. If the authorization hops to a different data center, then the authorization level multiple data center session adoption will occur by creating a new session in the data center servicing the authorization request and setting the session index of the new session as the incoming session ID. In some embodiments, subsequent authentication requests will only be aware of the clusterid:sessionid mapping available in the access manager ID cookie. The session hop to a different data center for authorization, if any, may go unnoticed during the authentication request.

The access manager GITO cookie may be provided to address this gap. In some embodiments, the access manager GITO cookie also facilitates timeout tracking across web gate agents. During authorization, the access manager GITO cookie is set as a domain cookie. For subsequent authentication requests, the access manager GITO cookie will be available with the following attributes in it: DC Identifier; Session Identifier; User Identifier; Last Access Time; and Token Creation Time. During a subsequent authentication, the contents of the access manager GITO cookie can be read to determine the 'latest session' information and the inactivity and/or idle time out values. In embodiments that use the GITO cookie, multiple data center session adoption will be done based on the information available in the access manager GITO cookie.

In some embodiments, an authentication manager authn cookie may not be updated during authorization, resulting in the newly created session ID not being persisted in the access manager authn cookie for future authorization references. To overcome this issue, the remote data center session ID (e.g., data center 110) and the local data center session IDs (e.g., for data center 114) may be linked through session indexing. For example, during an authorization call to a data center, a new session can be created under the following conditions: Session matching session ID in the access manager Auth/ObSSO cookie is not present in the local data center; multiple data center is enabled; no session with session index matching session ID in the access manager Auth or obsso cookie; valid session exists in the remote data center, based on the multiple data center SessionSync policy; and Under such scenarios, a new session is created in the local data center with a session index referring to a session ID in the access manager Auth/ObSSO cookie.

Based on the policies that are set up for the MDC, various different actions may be taken to perform session adoption. For example, session adoption may occur without re-authentication, session invalidation, or session data retrieval, in which case a user may have affinity with a first data center (referred to as "data center 1 (DC1)"). Session adoption under this scenario includes a user requesting a resource stored and/or managed by DC1. The user's request is routed to DC1 both because the user has affinity with the first data center and because the resource is stored and/or managed by DC1. The user is then authenticated by DC1. Upon successful authentication, the access manager ID cookie is augmented with a unique data center identifier referencing DC1 (e.g., the cluster ID of DC1). Once authenticated, the user can access the access manager protected resource in DC1. The user may then request a resource that is stored and/or managed by a second data center (referred to as "data center 2 (DC2)"). The user request is routed to data center 2 (DC2) by a global load balancer. The access manager server in DC2 is presented with the access manager ID cookie issued by DC1. Upon a successful validation, the access manager server knows that this is user coming from a remote DC1. The access manager server in DC2 may look up the session adoption policy (no re-authentication, no remote session invalidation, no remote session data retrieval) in order to determine the parameters for which to create a local session. The access manager server in DC2 may then create a local access manager user session using the information present in the access manager ID cookie and may re-initialize the static session information. The access manager server in DC2 may update the access manager ID cookie with its data center identifier, such as its cluster ID (e.g., data center chaining is recorded in the access manager ID cookie). In some embodiments, the user may then attempt to access the access manager protected resources in DC1, in which case the user's request is routed to DC1 by the global load balancer. The access manager server in DC1 is then presented the access manager ID cookie issued by DC1 and updated by DC2. Upon a successful validation, the access manager server knows that this user has sessions in DC1 and DC2. The access manager server tries to locate the session (by ID) referenced in the access manager ID cookie. If found, the session is updated. If the session is not found, the access manager server in DC1 may look up the session adoption policy (no re-authentication, no remote session invalidation, no remote session data retrieval). The access manager server in DC1 may then update the access manager ID cookie with its data center identifier, such as its cluster ID (e.g., data center chaining is recorded in the access manager ID cookie).

As another example, session adoption may occur without re-authentication and with session invalidation and session data retrieval. Again, a user may have affinity with DC1. Session adoption under this scenario includes a user requesting a resource stored and/or managed by DC1. The user's request is routed to DC1 both because the user has affinity with the first data center and because the resource is stored and/or managed by DC1. The user is then authenticated by DC1. Upon successful authentication, the access manager ID cookie is augmented with a unique data center identifier referencing DC1 (e.g., the cluster ID of DC1). Once authenticated, the user can access the access manager protected resource in DC1. The user may then request a resource that is stored and/or managed by a second data center (referred to as "data center 2 (DC2)"). The user request is routed to data center 2 (DC2) by a global load balancer. The access manager server in DC2 is presented with the access manager ID cookie issued by DC1. Upon a successful validation, the access manager server knows that this is user coming from a remote DC1. The access manager server in DC2 may look up the session adoption policy (no re-authentication, but with remote session invalidation and remote session data retrieval) in order to determine the parameters for which to create a local session. Based upon these policies, the access manager server in DC2 may make a back-channel (e.g., an OAP protocol) call to access manager server in DC1 to retrieve session data (using ID) (according to the remote session data retrieval policy) followed by a termination of the session (according to the remote session invalidation policy). In some embodiments, if the session data retrieval of the previous step fails due to a bad session reference or the like, a local session is created at DC2 using the following steps. The access manager server in DC2 may create a local access manager user session using the information present in the access manager ID cookie and may re-initialize the static session information. The access manager server in DC2 may rewrite the access manager ID cookie with its data center identifier, such as its cluster ID. In some embodiments, the user may then attempt to access the access manager protected resources in DC1, in which case the user's request is routed to DC1 by the global load balancer. The access manager server in DC1 is then presented the access manager ID cookie issued by DC2. Upon a successful validation, the access manager server knows that this user has a session in DC2 (but not in DC1 because the session was terminated according to the remote session invalidation policy). The access manager server in DC1 may then make a back-channel (e.g., an OAP protocol) call to the access manager server in DC2 to retrieve session data (using ID) followed by a termination of the session in DC2. If found, the session is created using the retrieved data. If the session is not found, the access manager server in DC1 creates a session.

Another example of session adoption may occur without re-authentication and without session invalidation, but with session data retrieval. Under these policy parameters, session adoption without re-authentication occurs similar to the previous examples except that the no-local sessions are not terminated and the local session is created using session data retrieved from the remote data center. In some embodiments, the access manager ID cookie is updated to include an attribute that indicates which data center is currently being accessed.

Figure 5:
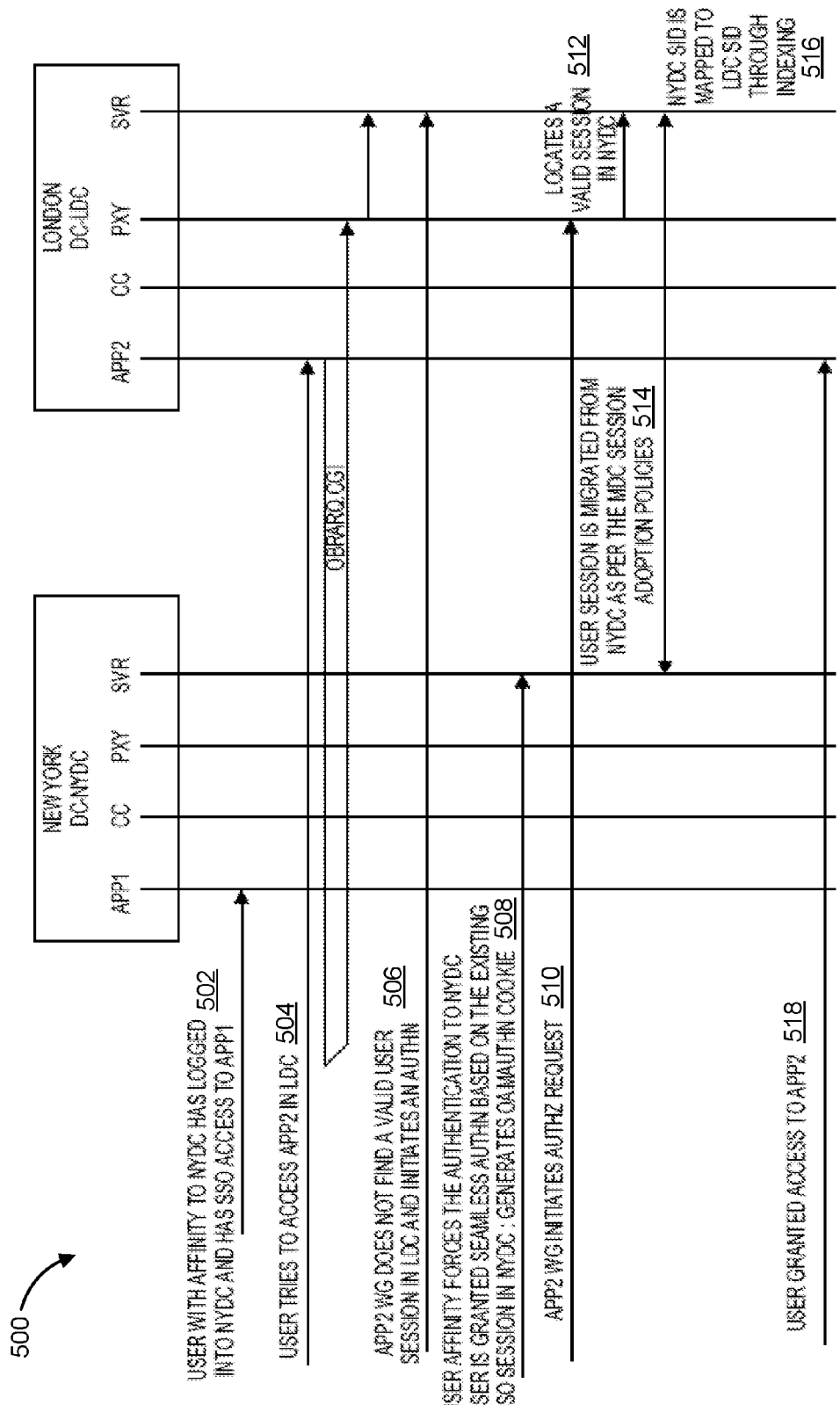
FIG. 5 is a sequence diagram in accordance with an embodiment.

FIG. 5 is a sequence diagram 500 showing messages that may be communicated between data centers while authorization and authentication are performed by different data centers due to user affinity. In the example illustrated in FIG. 5, a user has affinity with a New York data center (NYDC). Accordingly, any authentication request for the user is served by NYDC due to the user affinity, and an authorization request is presented to a London data center (LDC) when the LDC is the endpoint for a resource's web gate agent. The example illustrated in FIG. 5 includes enabling remote session termination or session invalidation, which requires a combination of access manager ID, authorization cookie (access manager Authn/Obsso) and GITO cookie to perform the seamless multiple data center operations.

At step 502, the user may attempt to access a first resource, such as application 1 (APP1). Based on the user's affinity with NYDC, the user is authenticated by NYDC. Upon a successful authentication, the access manager ID cookie is augmented with a unique data center identifier referencing NYDC (e.g., the cluster ID of NYDC). A subsequent authorization call will also be served by the NYDC as the NYDC is the primary server for the accessed resource (e.g., the end point for the web gate protecting the resource). The authorization flow will generate the authorization cookie, which will include the NYDC unique identifier. Upon successful authentication and authorization, the user will be granted SSO access to the resource APP1.

At step 504, the user may attempt to access a second resource, such as application 2 (APP2), which is stored and/or managed in LDC (e.g., by a web gate for APP2 with LDC as its end point). At step 506, the web gate for APP2 may not find a valid session in LDC, and, as a result, may initiate an authentication. At step 508, the authentication request will reach NYDC due to user affinity with NYDC. Based on the user's previously existing SSO session in NYDC, seamless authentication will happen at NYDC. The access manager authn cookie contents will be generated and are shared with APP2 web gate.

At step 510 8, since the primary server for APP2 is LDC, the web gate will forward the subsequent authorization request to LDC along with the authorization cookie. At 512, during authorization, LDC will determine that this is an multiple data center scenario, and determines that a valid session is present in NYDC.

Based on the valid session being present in NYDC and the applicable MDC session adoption policies (e.g., session data retrieval), the LDC performs authorization for this request by synchronizing and/or honoring the remote session that exists in NYDC. At 514, the user session is migrated from the NYDC according to the MDC session adoption policies. A new session will then be created in the LDC during authorization, and the incoming session ID will be set as the new session's index. At 516, the NYDC session ID is mapped to the LDC session ID through indexing. At 518, the user is granted access to the second resource.

Subsequent authorization calls are honored as long as the session search by index returns a valid session in LDC. Each authorization will update the GITO cookie with the cluster-id, session-id, and access time. The GITO cookie will be re-written as authorization response each time. If a subsequent authentication request from the same user is directed to NYDC, then NYDC will use the information in access manager ID and GITO cookie to determine which data center has the latest session for the current user. Accordingly the multiple data center flows are triggered to honor the user request seamlessly based on the multiple data center session adoption policies.

In some embodiments, a logout policy may be used to ensure that all server side sessions across data centers within the MDC and all the authentication cookies are cleared out. In cases where session invalidation is used, termination of a session artifact over the back-channel may not remove session cookie and state information maintained in the web gates, but the lack of a server session will result in an authorization failure resulting in re-authentication. In cases where no session invalidation is used, when users are logged out (e.g., manually, timed-out, or the like), the logout process may clear out all the server side sessions across data centers that are part of the current SSO session. For example, a data center for which a user has affinity may sends a terminate session request to all the relevant data centers associated with a user's SSO session. The terminate session request results in cleaning off all user sessions associated with the SSO across the data centers.

In some embodiments, termination of a user's sessions can occur in a reverse daisy chain order. For example, the sessions may be logged out in the order in which the user logged onto the system. In some embodiments, the logout or termination request can be broadcast to all other data centers within the MDC when the user logs off (or times out) of his or her last data center of use. One of ordinary skill will understand that other terminations are also available.

Figure 6:
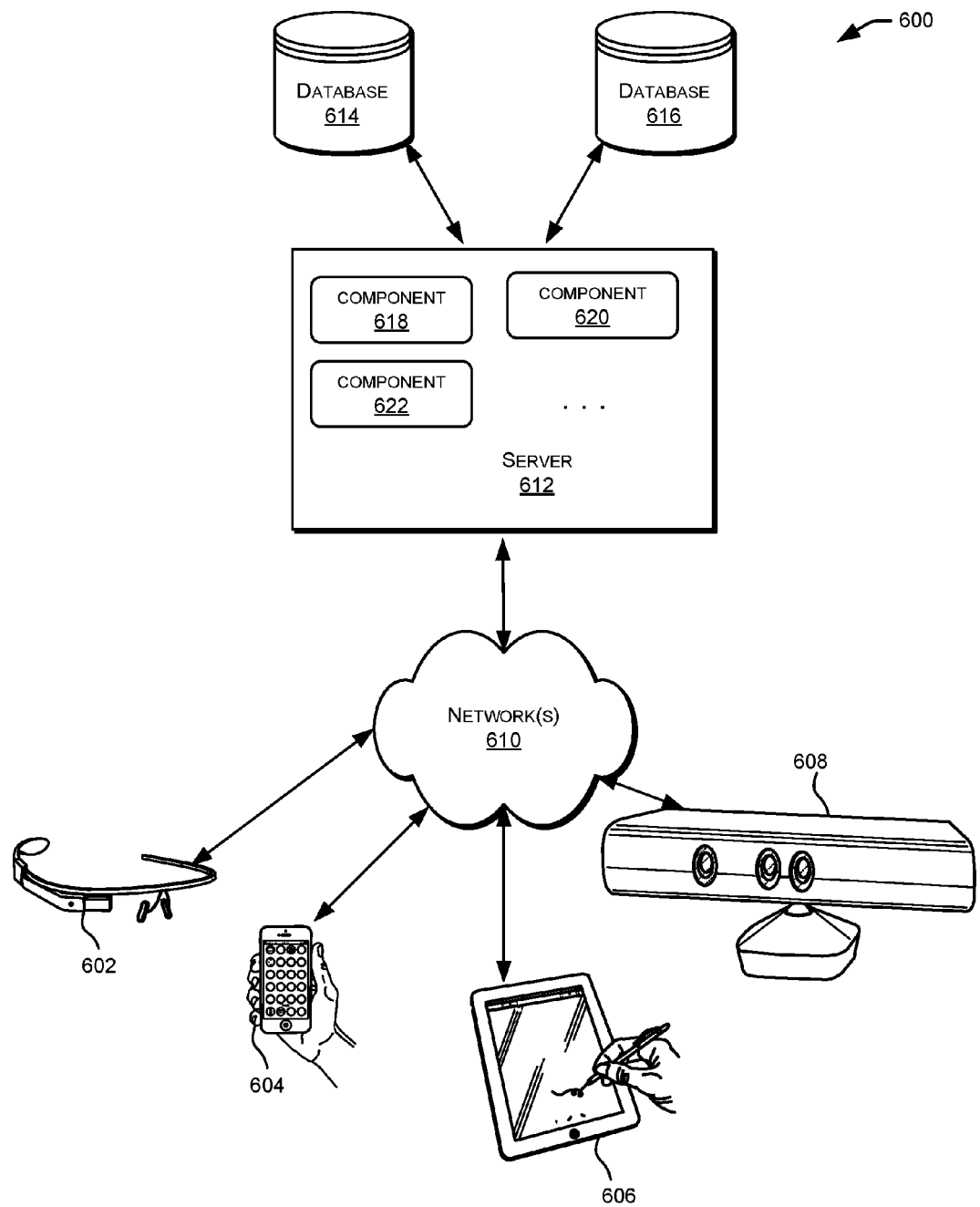
FIG. 6 depicts a simplified diagram of a distributed system for implementing one or more of the embodiments.

FIG. 6 depicts a simplified diagram of a distributed system 600 for implementing one of the embodiments. In the illustrated embodiment, distributed system 600 includes one or more client computing devices 602, 604, 606, and 608, which are configured to execute and operate a client application such as a web browser, proprietary client (e.g., Oracle Forms), or the like over one or more network(s) 610. Server 612 may be communicatively coupled with remote client computing devices 602, 604, 606, and 608 via network 610.

In various embodiments, server 612 may be adapted to run one or more services or software applications provided by one or more of the components of the system. In some embodiments, these services may be offered as web-based or cloud services or under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in the figure, the software components 618, 620 and 622 of system 600 are shown as being implemented on server 612. In other embodiments, one or more of the components of system 600 and/or the services provided by these components may also be implemented by one or more of the client computing devices 602, 604, 606, and/or 608. Users operating the client computing devices may then utilize one or more client applications to use the services provided by these components. These components may be implemented in hardware, firmware, software, or combinations thereof. It should be appreciated that various different system configurations are possible, which may be different from distributed system 600. The embodiment shown in the figure is thus one example of a distributed system for implementing an embodiment system and is not intended to be limiting.

Client computing devices 602, 604, 606, and/or 608 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 602, 604, 606, and 608 may be any other electronic device, such as a thin-client computer, an Internet-enabled gaming system (e.g., a Microsoft Xbox gaming console with or without a Kinect® gesture input device), and/or a personal messaging device, capable of communicating over network(s) 610.

Although exemplary distributed system 600 is shown with four client computing devices, any number of client computing devices may be supported. Other devices, such as devices with sensors, etc., may interact with server 612.

Network(s) 610 in distributed system 600 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 610 can be a local area network (LAN), such as one based on Ethernet, Token-Ring and/or the like. Network(s) 610 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 612 may be adapted to run one or more services or software applications described in the foregoing disclosure. For example, server 612 may correspond to a server for performing processing described above according to an embodiment of the present disclosure.

Server 612 may run an operating system including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more databases 614 and 616. Databases 614 and 616 may reside in a variety of locations. By way of example, one or more of databases 614 and 616 may reside on a non-transitory storage medium local to (and/or resident in) server 612. Alternatively, databases 614 and 616 may be remote from server 612 and in communication with server 612 via a network-based or dedicated connection. In one set of embodiments, databases 614 and 616 may reside in a storage-area network (SAN). Similarly, any necessary files for performing the functions attributed to server 612 may be stored locally on server 612 and/or remotely, as appropriate. In one set of embodiments, databases 614 and 616 may include relational databases, such as databases provided by Oracle, that are adapted to store, update, and retrieve data in response to SQL-formatted commands.

Figure 7:
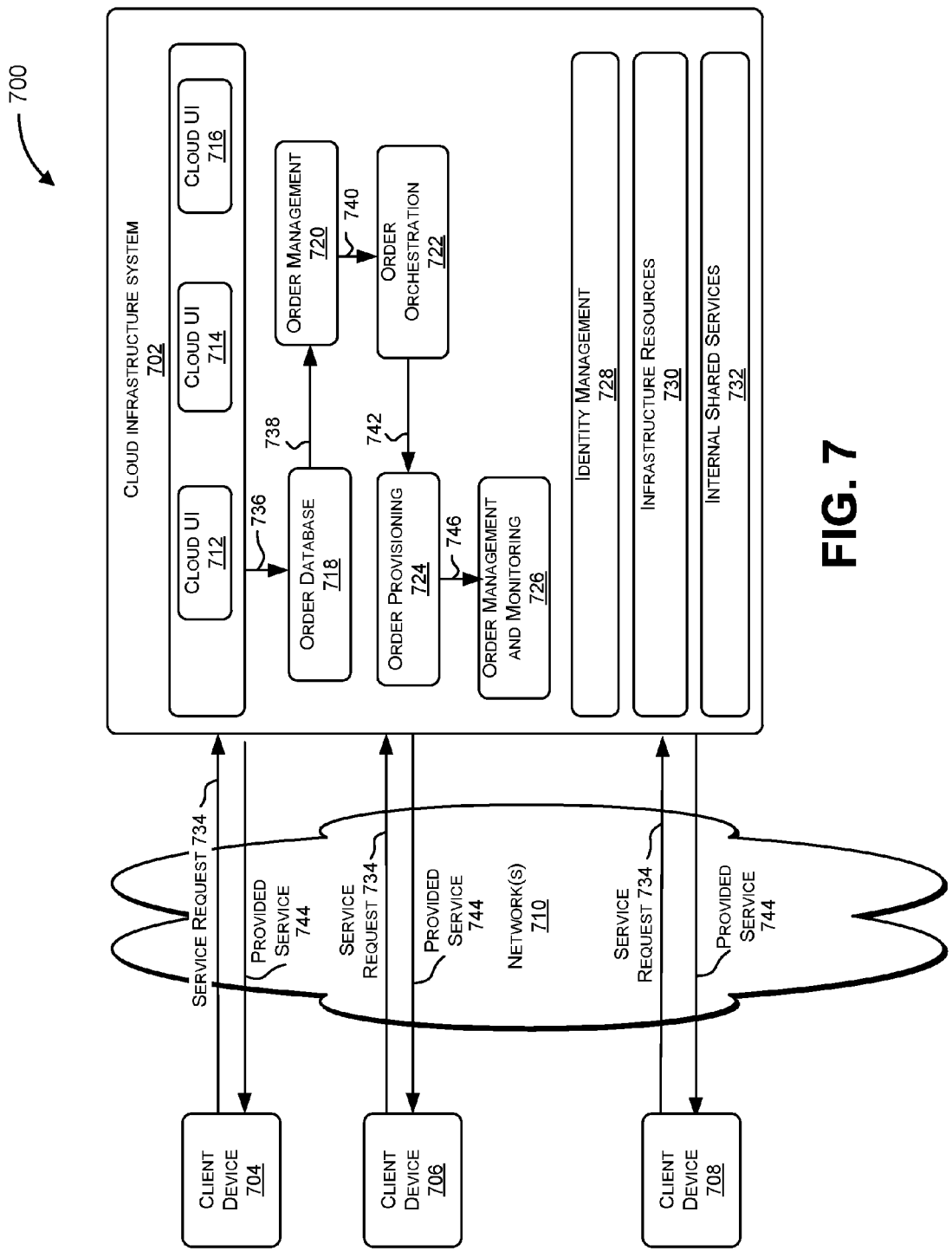
FIG. 7 is a simplified block diagram of components of a system environment by which services provided by the components of an embodiment system may be offered as cloud services, in accordance with an embodiment of the present disclosure.

FIG. 7 is a simplified block diagram of one or more components of a system environment 700 by which services provided by one or more components of an embodiment system may be offered as cloud services, in accordance with an embodiment of the present disclosure. In the illustrated embodiment, system environment 700 includes one or more client computing devices 704, 706, and 708 that may be used by users to interact with a cloud infrastructure system 702 that provides cloud services. The client computing devices may be configured to operate a client application such as a web browser, a proprietary client application (e.g., Oracle Forms), or some other application, which may be used by a user of the client computing device to interact with cloud infrastructure system 702 to use services provided by cloud infrastructure system 702.

It should be appreciated that cloud infrastructure system 702 depicted in the figure may have other components than those depicted. Further, the embodiment shown in the figure is only one example of a cloud infrastructure system that may incorporate an embodiment of the invention. In some other embodiments, cloud infrastructure system 702 may have more or fewer components than shown in the figure, may combine two or more components, or may have a different configuration or arrangement of components.

Client computing devices 704, 706, and 708 may be devices similar to those described above for 602, 604, 606, and 608.

Although exemplary system environment 700 is shown with three client computing devices, any number of client computing devices may be supported. Other devices such as devices with sensors, etc. may interact with cloud infrastructure system 702.

Network(s) 710 may facilitate communications and exchange of data between clients 704, 706, and 708 and cloud infrastructure system 702. Each network may be any type of network familiar to those skilled in the art that can support data communications using any of a variety of commercially-available protocols, including those described above for network(s) 610.

Cloud infrastructure system 702 may comprise one or more computers and/or servers that may include those described above for server 612.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 702 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 702 may be adapted to automatically provision, manage and track a customer's subscription to services offered by cloud infrastructure system 702. Cloud infrastructure system 702 may provide the cloud services via different deployment models. For example, services may be provided under a public cloud model in which cloud infrastructure system 702 is owned by an organization selling cloud services (e.g., owned by Oracle) and the services are made available to the general public or different industry enterprises. As another example, services may be provided under a private cloud model in which cloud infrastructure system 702 is operated solely for a single organization and may provide services for one or more entities within the organization. The cloud services may also be provided under a community cloud model in which cloud infrastructure system 702 and the services provided by cloud infrastructure system 702 are shared by several organizations in a related community. The cloud services may also be provided under a hybrid cloud model, which is a combination of two or more different models.

In some embodiments, the services provided by cloud infrastructure system 702 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 702. Cloud infrastructure system 702 then performs processing to provide the services in the customer's subscription order.

In some embodiments, the services provided by cloud infrastructure system 702 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 702 may also include infrastructure resources 730 for providing the resources used to provide various services to customers of the cloud infrastructure system. In one embodiment, infrastructure resources 730 may include pre-integrated and optimized combinations of hardware, such as servers, storage, and networking resources to execute the services provided by the PaaS platform and the SaaS platform.

In some embodiments, resources in cloud infrastructure system 702 may be shared by multiple users and dynamically re-allocated per demand. Additionally, resources may be allocated to users in different time zones. For example, cloud infrastructure system 730 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 732 may be provided that are shared by different components or modules of cloud infrastructure system 702 and by the services provided by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 702 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 702, and the like.

In one embodiment, as depicted in the figure, cloud management functionality may be provided by one or more modules, such as an order management module 720, an order orchestration module 722, an order provisioning module 724, an order management and monitoring module 726, and an identity management module 728. These modules may include or be provided using one or more computers and/or servers, which may be general purpose computers, specialized server computers, server farms, server clusters, or any other appropriate arrangement and/or combination.

In exemplary operation 734, a customer using a client device, such as client device 704, 706 or 708, may interact with cloud infrastructure system 702 by requesting one or more services provided by cloud infrastructure system 702 and placing an order for a subscription for one or more services offered by cloud infrastructure system 702. In certain embodiments, the customer may access a cloud User Interface (UI), cloud UI 712, cloud UI 714 and/or cloud UI 716 and place a subscription order via these UIs. The order information received by cloud infrastructure system 702 in response to the customer placing an order may include information identifying the customer and one or more services offered by the cloud infrastructure system 702 that the customer intends to subscribe to.

After an order has been placed by the customer, the order information is received via the cloud UIs, 712, 714 and/or 716.

At operation 736, the order is stored in order database 718. Order database 718 can be one of several databases operated by cloud infrastructure system 718 and operated in conjunction with other system elements.

At operation 738, the order information is forwarded to an order management module 720. In some instances, order management module 720 may be configured to perform billing and accounting functions related to the order, such as verifying the order, and upon verification, booking the order.

At operation 740, information regarding the order is communicated to an order orchestration module 722. Order orchestration module 722 may utilize the order information to orchestrate the provisioning of services and resources for the order placed by the customer. In some instances, order orchestration module 722 may orchestrate the provisioning of resources to support the subscribed services using the services of order provisioning module 724.

In certain embodiments, order orchestration module 722 enables the management of business processes associated with each order and applies business logic to determine whether an order should proceed to provisioning. At operation 742, upon receiving an order for a new subscription, order orchestration module 722 sends a request to order provisioning module 724 to allocate resources and configure those resources needed to fulfill the subscription order. Order provisioning module 724 enables the allocation of resources for the services ordered by the customer. Order provisioning module 724 provides a level of abstraction between the cloud services provided by cloud infrastructure system 700 and the physical implementation layer that is used to provision the resources for providing the requested services. Order orchestration module 722 may thus be isolated from implementation details, such as whether or not services and resources are actually provisioned on the fly or pre-provisioned and only allocated/assigned upon request.

At operation 744, once the services and resources are provisioned, a notification of the provided service may be sent to customers on client devices 704, 706 and/or 708 by order provisioning module 724 of cloud infrastructure system 702.

At operation 746, the customer's subscription order may be managed and tracked by an order management and monitoring module 726. In some instances, order management and monitoring module 726 may be configured to collect usage statistics for the services in the subscription order, such as the amount of storage used, the amount data transferred, the number of users, and the amount of system up time and system down time.

In certain embodiments, cloud infrastructure system 700 may include an identity management module 728. Identity management module 728 may be configured to provide identity services, such as access management and authorization services in cloud infrastructure system 700. In some embodiments, identity management module 728 may control information about customers who wish to utilize the services provided by cloud infrastructure system 702. Such information can include information that authenticates the identities of such customers and information that describes which actions those customers are authorized to perform relative to various system resources (e.g., files, directories, applications, communication ports, memory segments, etc.) Identity management module 728 may also include the management of descriptive information about each customer and about how and by whom that descriptive information can be accessed and modified.

Figure 8:
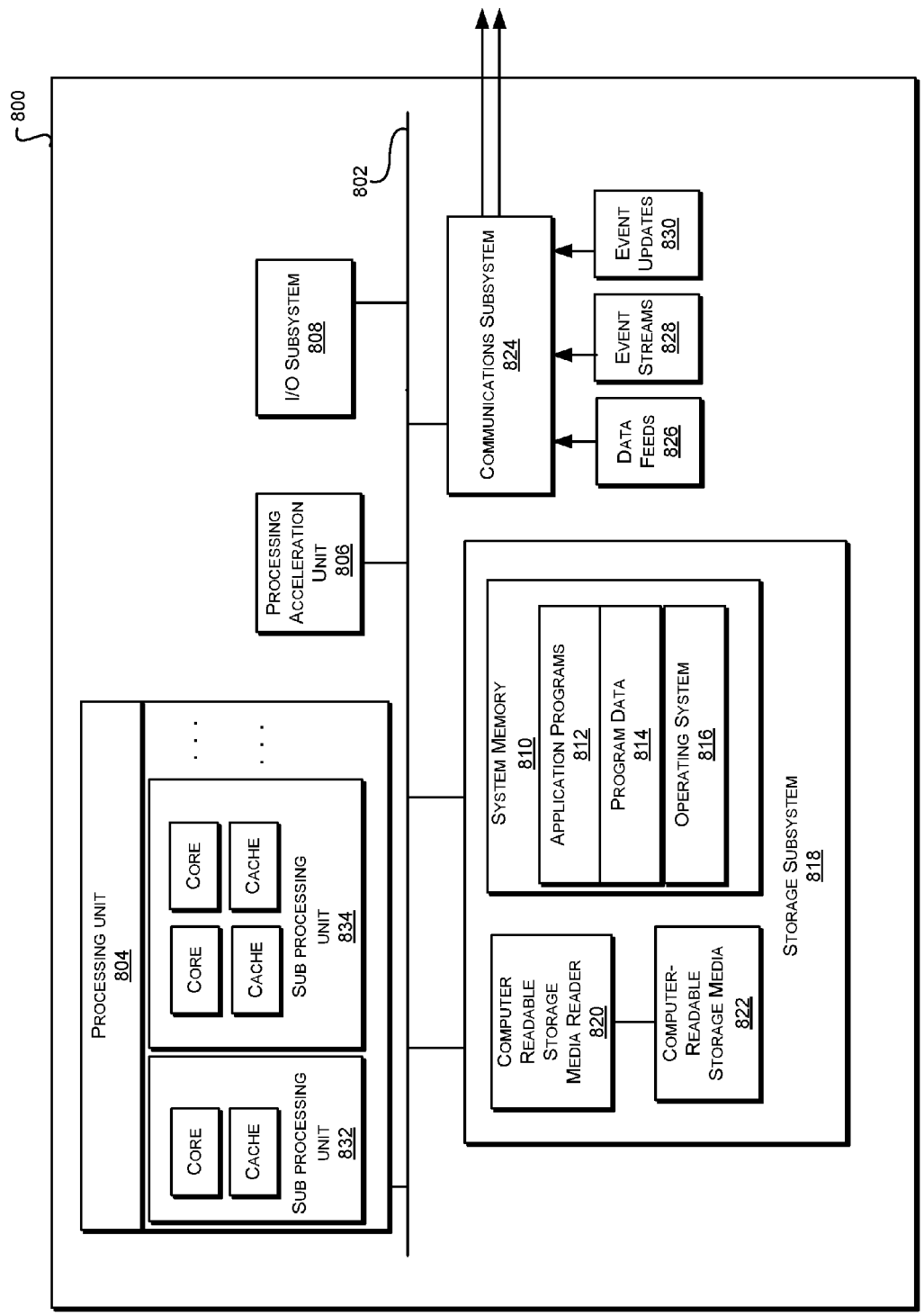
FIG. 8 illustrates an exemplary computer system, in which various embodiments of the present invention may be implemented.

FIG. 8 illustrates an exemplary computer system 800, in which various embodiments of the present invention may be implemented. The system 800 may be used to implement any of the computer systems described above. As shown in the figure, computer system 800 includes a processing unit 804 that communicates with a number of peripheral subsystems via a bus subsystem 802. These peripheral subsystems may include a processing acceleration unit 806, an I/O subsystem 808, a storage subsystem 818 and a communications subsystem 824. Storage subsystem 818 includes tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 804, which can be implemented as one or more integrated circuits (e.g., a conventional microprocessor or microcontroller), controls the operation of computer system 800. One or more processors may be included in processing unit 804. These processors may include single core or multicore processors. In certain embodiments, processing unit 804 may be implemented as one or more independent processing units 832 and/or 834 with single or multicore processors included in each processing unit. In other embodiments, processing unit 804 may also be implemented as a quad-core processing unit formed by integrating two dual-core processors into a single chip.

In various embodiments, processing unit 804 can execute a variety of programs in response to program code and can maintain multiple concurrently executing programs or processes. At any given time, some or all of the program code to be executed can be resident in processor(s) 804 and/or in storage subsystem 818. Through suitable programming, processor(s) 804 can provide various functionalities described above. Computer system 800 may additionally include a processing acceleration unit 806, which can include a digital signal processor (DSP), a special-purpose processor, and/or the like.

I/O subsystem 808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 800 may comprise a storage subsystem 818 that comprises software elements, shown as being currently located within a system memory 810. System memory 810 may store program instructions that are loadable and executable on processing unit 804, as well as data generated during the execution of these programs.

Depending on the configuration and type of computer system 800, system memory 810 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 804. In some implementations, system memory 810 may include multiple different types of memory, such as static random access memory (SRAM) or dynamic random access memory (DRAM). In some implementations, a basic input/output system (BIOS), containing the basic routines that help to transfer information between elements within computer system 800, such as during start-up, may typically be stored in the ROM. By way of example, and not limitation, system memory 810 also illustrates application programs 812, which may include client applications, Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 818 may also provide a tangible computer-readable storage medium for storing the basic programming and data constructs that provide the functionality of some embodiments. Software (programs, code modules, instructions) that when executed by a processor provide the functionality described above may be stored in storage subsystem 818. These software modules or instructions may be executed by processing unit 804. Storage subsystem 818 may also provide a repository for storing data used in accordance with the present invention.

Storage subsystem 800 may also include a computer-readable storage media reader 820 that can further be connected to computer-readable storage media 822. Together and, optionally, in combination with system memory 810, computer-readable storage media 822 may comprehensively represent remote, local, fixed, and/or removable storage devices plus storage media for temporarily and/or more permanently containing, storing, transmitting, and retrieving computer-readable information.

Computer-readable storage media 822 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 800.

By way of example, computer-readable storage media 822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to connect to one or more devices via the Internet. In some embodiments communications subsystem 824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

In some embodiments, communications subsystem 824 may also receive input communication in the form of structured and/or unstructured data feeds 826, event streams 828, event updates 830, and the like on behalf of one or more users who may use computer system 800.

By way of example, communications subsystem 824 may be configured to receive data feeds 826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 824 may also be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A method comprising:
generating, by a first computer system managing access at a first data center, an authentication cookie associated with a user, wherein the authentication cookie is generated using a first session object for a first session established at the first data center, the first session established based on upon successful authentication of the user at the first data center for access to a first resource at a client device, wherein the first session object is stored at the first data center, and wherein the authentication cookie includes an identifier that identifies the first data center;
sending the generated authentication cookie to the client device associated with the user to provide the access to the first resource;
based on no active session for the user at a second data center and responsive to a request, by the user at the client device, to the second data center for access to a second resource at the client device, the request including the generated authentication cookie having the identifier of the first data center as having a session:
receiving, by the first computer system, from a second computer system managing access at the second data center, a retrieval request having the identifier of the first data center obtained from the generated authentication cookie provided in the request to the second data center, wherein the retrieval request is a message requesting session information for the first session established for the user at the first data center;
responsive to the retrieval request, determining, based on the first session object, whether the first session for the user is active at the first data center;
based on determining that the first session for the user is active at the first data center, transmitting, by the first computer system, to the second computer system of a second data center, session data indicated by the first session object, wherein a second session object is generated for a second session enabling access to the second resource by the second computer system for the second data center using the session data, and wherein the second session object is generated for authentication of the user at the second data center; and
based on receiving an indication that the second session object at the second data center has been generated for the second session using the session data, terminating, by the first computer system, the first session associated with the user at the first data center based on receiving the indication that the second session object at the second data center has been generated.

2. The method of claim 1, wherein the terminating is performed based on a session policy, the session policy indicating a session threshold of a single active session for both the first data center and the second data center.

3. The method of claim 1, wherein the indication is a first indication, and wherein the method further comprises:
receiving, by the first computer system, a second indication of the user exiting access for the second session at the second data center; and
terminating, by the first computer system, the first session associated with the user at the first data center in response to receiving the second indication of the user exiting access for the second session at the second data center.

4. The method of claim 1, wherein the request to the second data center is a first request, and wherein the method further comprises:
sending, by the first computer system, to the client device, a second request that causes the client device to prompt the user for authentication information based on a session policy.

5. The method of claim 1, wherein the session data is for authentication of the user at the second data center, and wherein the session data identifies the first session at the first data center based on the successful authentication of the user at the first data center for access to the first resource at the client device.

6. The method of claim 1, wherein the request to the second data center is a first request, and wherein the method further comprises:
responsive to receiving the retrieval request for the session information for the first session, sending, by the first computer system, to the client device, a second request for credential information of the user; and
receiving, by the first computer system, the credential information from the client device responsive to the second request for credential information of the user;
wherein transmitting, by the first computer system, to the second computer system, the session data indicated by the first session object includes transmitting the credential information that is received from the client device.

7. A system comprising:
a first data storage system including:
  a memory storing a plurality of instructions; and
  one or more hardware processors; and
a second data storage system including a computer system;
wherein the plurality of instructions, when executed by the one or more hardware processors, cause the one or more hardware processors to:
  generate an authentication cookie associated with a user, wherein the authentication cookie is generated using a first session object for a first session established at the first data storage system, the first session established based on upon successful authentication of the user at the first data storage system for access to a first resource at a client device, wherein the first session object stored at the first data storage system, and wherein the authentication cookie includes an identifier that identifies the first data storage system;
  send the generated authentication cookie to the client device associated with the user to provide the access to the first resource;
  based on no active session for the user at the second data storage system and responsive to a request, by the user at the client device, to the second data storage system for access to a second resource at the client device, the request including the generated authentication cookie having the identifier of the first data storage system as having a session:
    receive, from a second computer system managing access at the second data storage system, a retrieval request having the identifier of the first data storage system obtained from the generated authentication cookie provided in the request to the second data storage system, wherein the retrieval request is a message requesting session information for the first session established for the user at the first data storage system;
    responsive to the retrieval request, determine, based on the first session object whether the first session for the user is active at the first data storage system; and
    based on determining that the first session for the user is active at the first data storage system, transmit, to the computer system of the second data storage system, session data indicated by the first session object, wherein a second session object is generated for a second session enabling access to the second resource by the computer system for the second data storage system using the session data, and wherein the second session object is generated for authentication of the user at the second data storage system; and
    based on receiving an indication that the second session object at the second data storage system has been generated for the second session using the session data, terminate the first session associated with the user at the first data storage system based on receiving the indication that the second session object at the second data storage system has been generated.

8. The system of claim 7, wherein the terminating is performed based on a session policy, the session policy indicating a session threshold of a single active session for both the first data storage system and the second data storage system.

9. The system of claim 7, wherein the indication is a first indication, and wherein the plurality of instructions, when executed by the one or more hardware processors, further causes the one or more hardware processors to:
  receive a second indication of the user exiting access for the second session at the second data storage system; and
  terminate the first session associated with the user at the first data storage system in response to receiving the second indication of the user exiting access for the second session at the second data storage system.

10. The system of claim 7, wherein the session data is for authentication of the user at the second data storage system, and wherein the session data identifies the first session at the first data storage system based on the successful authentication of the user at the first data storage system for access to the first resource at the client device.

11. The system of claim 7, wherein the request to the second data storage system is a first request, and wherein the plurality of instructions, when executed by the one or more hardware processors, further causes the one or more hardware processors to:
  responsive to receiving the retrieval request for the session information for the first session, send, to the client device, a second request for credential information of the user;
  receive the credential information from the client device responsive to the second request for credential information of the user; and
  wherein transmitting the session data indicated by the first session object includes transmitting the credential information that is received from the client device.

12. A non-transitory computer-readable medium storing a plurality of instructions executable by one or more processors to cause the one or more processors to:
  generate, by a first computer system managing access at a first data center, an authentication cookie associated with a user, wherein the authentication cookie is generated using a first session object for a first session established at the first data center, the first session established based on upon successful authentication of the user at the first data center for access to a first resource at a client device, wherein the first session object is stored at the first data center, and wherein the authentication cookie includes an identifier that identifies the first data center;
  send the generated authentication cookie to the client device associated with the user to provide the access to the first resource;
  based on no active session for the user at a second data center and responsive to a request, by the user at the client device, to the second data center for access to a second resource at the client device, the request including the generated authentication cookie having the identifier of the first data center as having a session:
    receive, by the first computer system, from a second computer system managing access at the second data center, a retrieval request having the identifier of the first data center obtained from the generated authentication cookie provided in the request to the second data center, wherein the retrieval request is a message requesting session information for the first session established for the user at the first data center;

responsive to the retrieval request, determine, based on the first session object, whether the first session for the user is active at the first data center;

based on determining that the first session for the user is active at the first data center, transmit, to second computer system of a second data center, session data indicated by the first session object, wherein a second session object is generated for a second session enabling access to the second resource by the second computer system for the second data center using the session data, and wherein the second session object is generated for authentication of the user at the second data center; and based on receiving an indication that the second session object at the second data center has been generated for the second session using the session data, terminate, by the first computer system, the first session associated with the user at the first data center based on receiving the indication that the second session object at the second data center has been generated.

13. The non-transitory computer-readable medium of claim 12, wherein the terminating is performed based on a session policy, the session policy indicating a session threshold of a single active session for both the first data center and the second data center.

14. The non-transitory computer-readable medium of claim 12, wherein the indication is a first indication, and wherein the plurality of instructions are executable by the one or more processors to further cause the one or more processors to:

receive a second indication of the user exiting access for the second session at the second data center; and terminate the first session of the user at the first data center in response to receiving the second indication of the user exiting access for the second session at the second data center.

15. The non-transitory computer-readable medium of claim 12, wherein the session data is for authentication of the user at the second data center, and wherein the session data identifies the first session at the first data center based on the successful authentication of the user at the first data center for access to the first resource at the client device.

16. The non-transitory computer-readable medium of claim 12, wherein the request to the second data center is a first request, and wherein the plurality of instructions are executable by the one or more processors to further cause the one or more processors to:

responsive to receiving the retrieval request for the session information, send to the client device, a second request for credential information of the user;

receive the credential information from the client device responsive to the second request for credential information of the user; and wherein transmitting the session data indicated by the first session object includes transmitting the credential information that is received from the client device.

* * * * *

UNITED STATES PATENT AND TRADEMARK OFFICE
CERTIFICATE OF CORRECTION

PATENT NO. : 9,887,981 B2  
APPLICATION NO. : 15/005365  
DATED : February 6, 2018  
INVENTOR(S) : Stephen Mathew et al.

Page 1 of 1

It is certified that error appears in the above-identified patent and that said Letters Patent is hereby corrected as shown below:

In the Claims

Column 33, Line 51 (Claim 7, Line 41): Delete "and".

Signed and Sealed this
Twenty-ninth Day of January, 2019

Andrei Iancu
*Director of the United States Patent and Trademark Office*